(12) United States Patent
Matsuzaki et al.

(10) Patent No.: US 7,949,703 B2
(45) Date of Patent: May 24, 2011

(54) GROUP ADMISSION SYSTEM AND SERVER AND CLIENT THEREFOR

(75) Inventors: Natsume Matsuzaki, Mino (JP); Toshihisa Nakano, Neyagawa (JP); Yuichi Futa, Osaka (JP)

(73) Assignee: Panasonic Corporation, Osaka (JP)

( * ) Notice: Subject to any disclaimer, the term of this patent is extended or adjusted under 35 U.S.C. 154(b) by 1258 days.

(21) Appl. No.: 10/751,964

(22) Filed: Jan. 7, 2004

(65) Prior Publication Data

US 2004/0162870 A1 Aug. 19, 2004

(30) Foreign Application Priority Data

Jan. 10, 2003 (JP) ................................. 2003-004838

(51) Int. Cl.
*G06F 15/16* (2006.01)
(52) U.S. Cl. ......... 709/201; 709/203; 709/229; 707/705
(58) Field of Classification Search .................. 709/201, 709/203–206; 707/705
See application file for complete search history.

(56) References Cited

U.S. PATENT DOCUMENTS

| | | | | |
|---|---|---|---|---|
| 5,812,653 A * | 9/1998 | Jodoin et al. | ............. | 379/205.01 |
| 6,105,063 A | 8/2000 | Hayes, Jr. | | |
| 6,182,109 B1 * | 1/2001 | Sharma et al. | ................ | 718/104 |
| 6,430,619 B1 | 8/2002 | Sitaraman et al. | | |
| 6,839,417 B2 * | 1/2005 | Weisman et al. | ........ | 379/204.01 |
| 6,857,019 B1 * | 2/2005 | Sitaraman et al. | ............ | 709/225 |
| 6,859,834 B1 | 2/2005 | Arora et al. | | |
| 6,898,436 B2 * | 5/2005 | Crockett et al. | ............. | 455/518 |
| 6,983,370 B2 * | 1/2006 | Eaton et al. | .................... | 713/182 |
| 7,092,821 B2 * | 8/2006 | Mizrahi et al. | .................... | 702/1 |
| 7,123,608 B1 * | 10/2006 | Scott et al. | ................... | 370/353 |
| 7,200,753 B1 * | 4/2007 | Shinzaki et al. | .............. | 713/182 |
| 7,203,966 B2 * | 4/2007 | Abburi et al. | ................... | 726/29 |
| 2002/0010783 A1 | 1/2002 | Primak et al. | | |
| 2002/0085721 A1 | 7/2002 | Saneto et al. | | |

(Continued)

FOREIGN PATENT DOCUMENTS

EP 0 794 490 9/1997

(Continued)

OTHER PUBLICATIONS

"5C Digital Transmission Content Protection White Paper", Jul. 14, 1998, pp. 1-13.
Tatsuaki Okamoto et al., "Contemporary Cryptography", Jun. 30, 1997, pp. 155-156 and its partial translation.
Nobuichi Ikeno et al., "Theory of Contemporary Cryptography", Sep. 1, 1986, pp. 175-177 and its partial translation.

(Continued)

*Primary Examiner* — Don Wong
*Assistant Examiner* — Tuan-Khanh Phan
(74) *Attorney, Agent, or Firm* — Wenderoth, Lind & Ponack, L.L.P.

(57) ABSTRACT

Disclosed is a group admission system having a client and a server that belongs to a closed group within which contents are available. The client determines whether it is permissible to request to join the group to be a member device thereof based on the number of groups that the client is in and the maximum number of groups that the client is permitted to be in. If permissible, the client transmits a registration request to the server with information unique to the client. The server determines whether to permit the client to join the group by registering with the server based on the number of member devices registered with the server and the maximum number of member devices registerable with the server. If it is permitted, the server registers the unique information, and transmits group identification information to the client. The client receives and stores the group identification information.

28 Claims, 20 Drawing Sheets

U.S. PATENT DOCUMENTS

| | | | |
|---|---|---|---|
| 2002/0116479 | A1 | 8/2002 | Ishida et al. |
| 2002/0138618 | A1* | 9/2002 | Szabo ........................... 709/225 |
| 2003/0084306 | A1* | 5/2003 | Abburi et al. ................. 713/188 |

FOREIGN PATENT DOCUMENTS

| | | |
|---|---|---|
| TW | 444181 | 4/1999 |
| WO | 01/13227 | 2/2001 |

OTHER PUBLICATIONS

"A Copy Protection System for Digital Home Networks".
"xCP: eXtensible Content Protection", pp. 1-5.
European Search Report issued Jun. 6, 2009 in European Application No. 09155604.3.

* cited by examiner

FIG.3

| REGISTRATION INFORMATION | |
|---|---|
| MAXIMUM NO. | 5 |
| REGISTERED NO. | 2 |
| REMAINING NO. | 3 |
| PASSWORD | ABCDEF |

FIG.4

| REGISTERED DEVICE LIST | | |
|---|---|---|
| CLIENT ID | REGISTRATION DATE-TIME | WITHDRAWAL DATE-TIME |
| ID_02e | 021015 - 1030 | 000000 - 0000 |
| ID_02f | 030820 - 2000 | 030827 - 0930 |
| | | |

FIG.6

| REGISTERED GROUP LIST ||
|---|---|
| MAXIMUM NO. | 3 |
| REGISTERED NO. | 2 |
| REMAINING NO. | 1 |
| GROUP ID | 3 |
| | 4 |
| | |

FIG.7

| WITHDRAWN GROUP LIST ||
|---|---|
| 1 | 4 |
| 2 | 3 |
|  |  |

REGISTERED DEVICE LIST SHARING

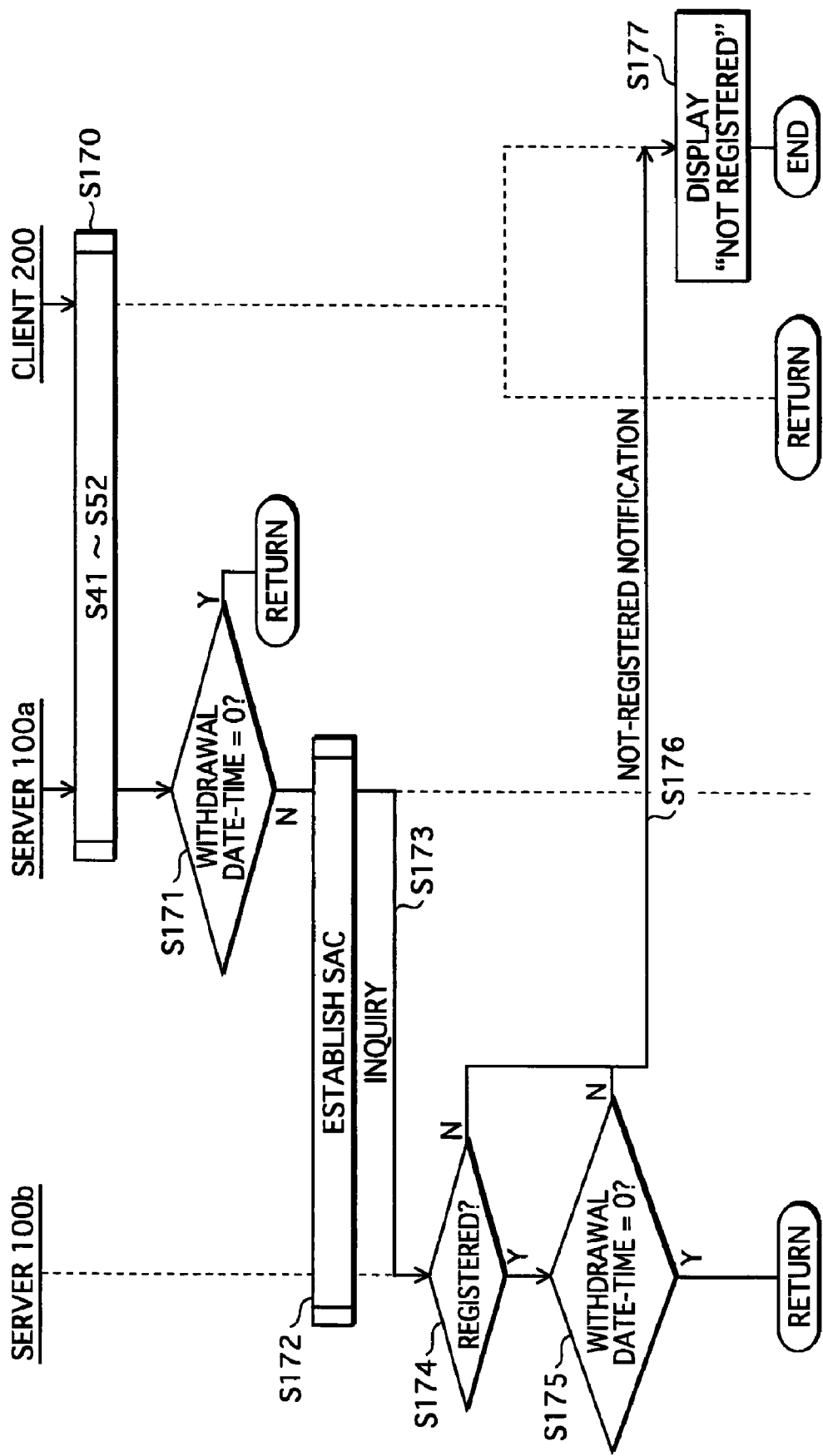

GROUP ADMISSION SYSTEM AND SERVER AND CLIENT THEREFOR

This application is based on an application No. 2003-004838 filed in Japan, the content of which is hereby incorporated by reference.

BACKGROUND OF THE INVENTION (1) Field of the Invention

The present invention relates to a group admission system for determining whether to permit a device to join a group within which digital works are available for use via a network, while preventing unauthorized use of the digital works by third parties not having legitimate rights.

(2) Description of the Related Art

In recent years, the easy acquisition of digital copyrighted works (hereinafter "contents"), such as music, videos, games and so forth, has become possible as a result of circulation using the Internet, digital broadcast, package media and the like.

JP unexamined patent application publication No. 2002-169726 discloses a music data management system whose aim is to enable use of contents by desiring information processing apparatuses, while preventing use by third parties not having legitimate rights.

In this music data management system, a plurality of personal computers (hereafter "PCs") each transmit a credit card number or the like to an authentication server together with the ID of a computer management program of the PC.

The authentication server receives the ID and the credit card number, and sorts PCs having the same credit card number into the same group. The PCs and their users are registered by recording the IDs and credit card numbers with respect to each group. After registration, the authentication server transmits a group key to each PC together with the ID and password of the corresponding group.

Each PC stores the received group key, group ID and password.

In this way, PCs having the same group key are able to transmit/receive contents using the group key.

Further, "5C Digital Transmission Content Protection White Paper" (Revision 1.0, Jul. 14, 1998) discloses a specification called DTCP (Digital Transmission Content Protection).

The DTCP is a specification for protecting contents from unauthorized use as they are distributed via a high-performance serial bus conforming to the IEEE1394 standard. Devices permitted to use contents are each provided with a secret key that is distributed under a license agreement from an administrator called a DTLA (Digital Transmission Licensing Administrator). For viewing a content, a transmitting device and a receiving device conduct mutual authentication using the respective secret keys, and the receiving end is allowed to view the content if the mutual authentication is successful.

Unfortunately, however, both the prior art techniques noted above have the following problems.

According to the technique disclosed in JP unexamined patent application publication No. 2002-169726, it is required to transmit a credit card number to an external authentication server via a network. Transmission of a credit card inevitably leads to a possibility that the credit card number is revealed and maliciously used.

According to the DTCP specification, use of contents is restricted to a personal use level by employing an IEEE1394-compliant bus of which physical length is limited. That is to say, when mutual authentication according to the DTCP specification is applied to contents distributed via, for example, the Internet, rather than an IEEE1394-compliant bus, an unlimited number of devices including outside devices can use the contents beyond a personal use level. Consequently, a range within which use of the contents is permitted is no longer restricted.

SUMMARY OF THE INVENTION

The present invention is made in view of the above problems and aims to provide a group admission system for determining whether to permit a user device to join a group within which contents are available without using personal information of the user.

To achieve the above aim, the present invention provides a group admission system in which a server and a client determine whether the client is permitted to join a closed group to be a member device thereof. The group is a range within which contents are available. The group admission system is composed of: a first restricting unit included in the client and operable to determine whether it is permissible for the client to request to join the group based on a number of groups that the client is in and a maximum number of groups that the client is permitted to be in; and a second restricting unit included in the server that supplies a content to member devices of the group and operable, when the client requests to join the group, to determine whether to permit the client to join the group by registering with the server based on a number of member devices registered with the server and a maximum number of member devices registerable with the server.

With the structure stated above, the number of clients registrable in the group is restricted and thus a limited number of clients are permitted to use the contents. Further, each client is restricted in the number of groups that the client may join, so that clients are prohibited from joining an unlimited number of groups.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows the structure of registration information;

FIG. 4 shows the structure of a registered device list;

FIG. 6 shows the structure of a registered group list;

FIG. 7 shows the structure of a withdrawn group list;

FIG. 20 is a flowchart showing operations for the server 100a to inquire the server 100b as to whether the client 200 is registered.

DESCRIPTION OF THE PREFERRED EMBODIMENT

The following describes an embodiment of the present invention with reference to the attached figures.

1. STRUCTURE OF DEVICE REGISTRATION SYSTEM 1

Figure 1:
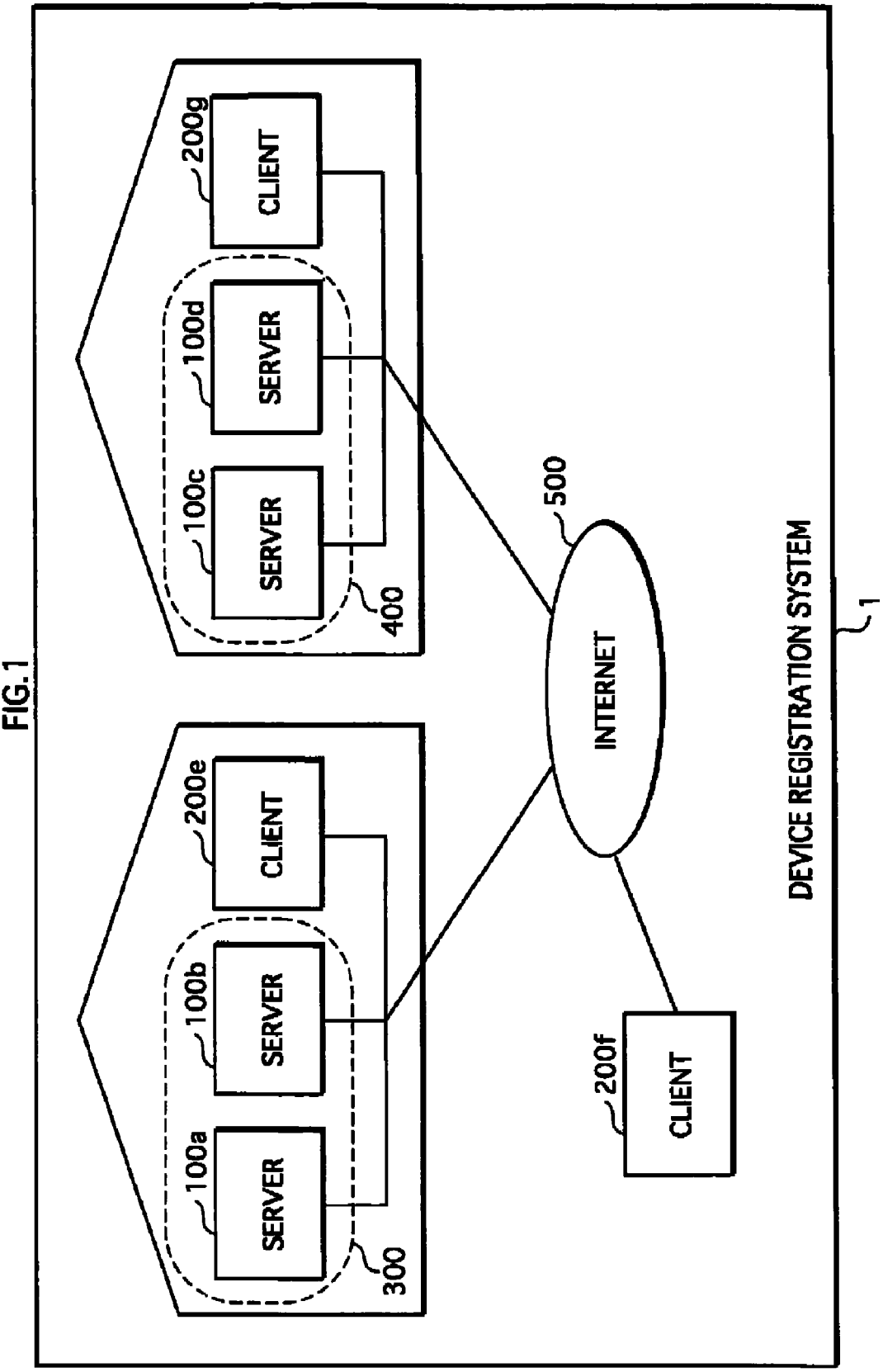
FIG. 1 is a block diagram showing the structure of device registration system 1.

As shown in FIG. 1, a device registration system 1 is composed of server devices (hereinafter, "servers") 100a-100d and client devices (hereinafter, "clients") 200e-200g each connected to the Internet 500.

The servers 100a and 100b as well as the client 200e are disposed in a user's home and mutually connected so as to form a home network. Further, the servers 100a and 100b belong to a group 300 in the home, share registration information and a registered device list, both of which will be described later, and act just as a single server.

The servers 100c and 100d and the client 200g are disposed in another home of the user. Similarly to the above, the servers 100c and 100d and the client 200g are mutually connected so as to form another home network. Further, the servers 100c and 100d belong to a group 400 in the other home, share registration information and a registered device list, both of which will be described later, and act just as a single server.

The client 200f is a portable device that the user may carry around and use at a location away from home.

When registered with the server 100a or 100b to join the group 300, the clients 200e-200g are allowed to use contents stored in the server 100a and 100b. Further, when registered with the server 100c or 100d to join the group 400, the clients 200e-200g are allowed to use contents stored in the server 100c and 100d.

For the convenience of the description, when no distinction is necessary among the servers 100a-100d, each server is uniformly denoted as the server 100. Similarly, each of the clients 200e-200g may be denoted uniformly as the client 200.

Hereinafter, the structures of each component of the device registration system 1 will be described in detail.

1.1 Structure of Server 100

Figure 2:
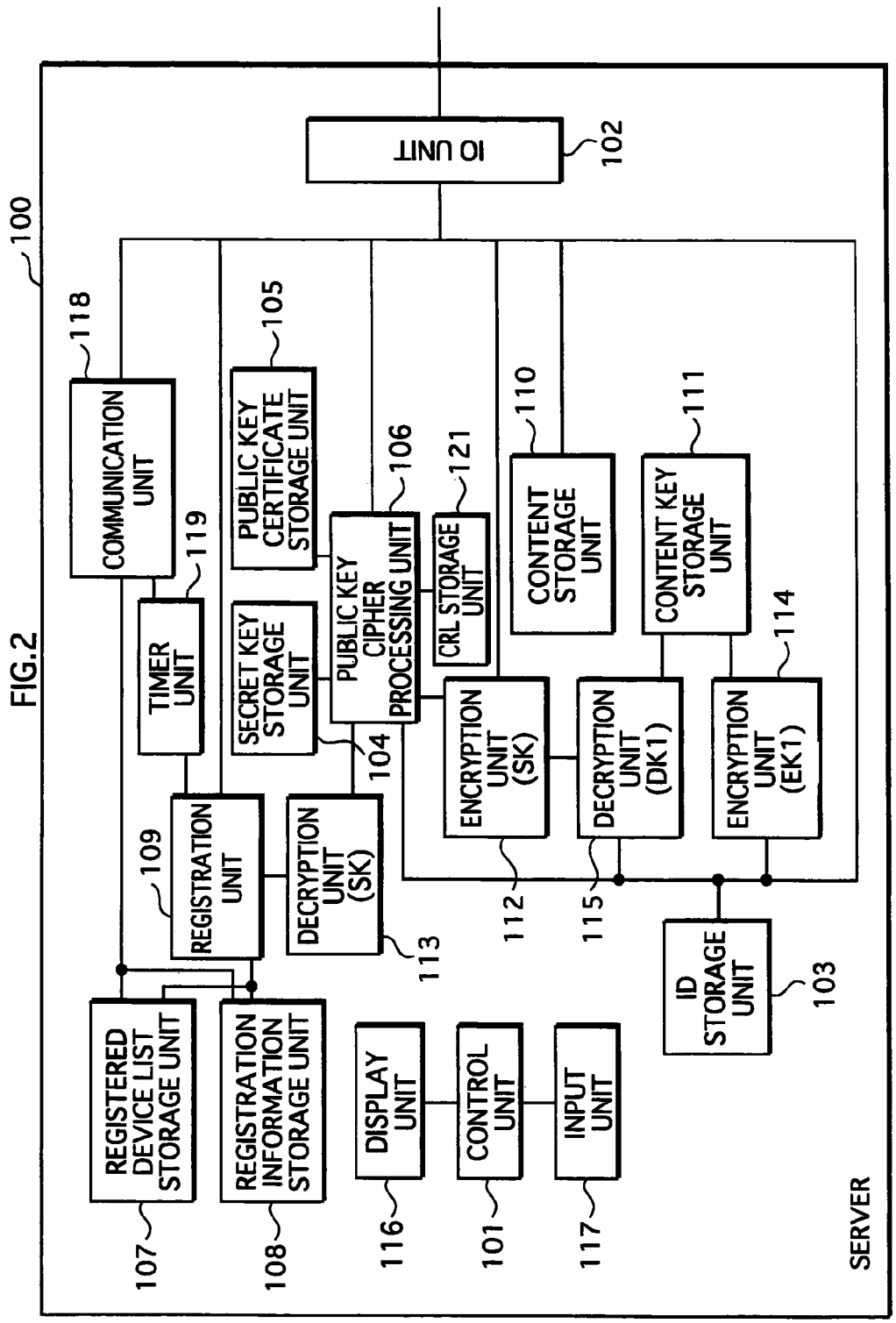
FIG. 2 is a block diagram showing the structure of a server 100.

As shown in FIG. 2, the server 100 is composed of a control unit 101, an IO (input/output) unit 102, an ID storage unit 103, a secret key storage unit 104, a public key certificate storage unit 105, and a public key cipher processing unit 106, a registered device list storage unit 107, a registration information storage unit 108, a registration unit 109, a content storage unit 110, a content key storage unit 111, an encryption unit 112, a decryption unit 113, an encryption unit 114, a decryption unit 115, a display unit 116, an input unit 117, a communication unit 118, a timer unit 119, and a CRL (Certification Revocation List) storage unit 121.

The server 100 is specifically a computer system composed generally of a microprocessor, a ROM, a RAM, a hard disk unit, a display unit, a keyboard, and a mouse. The RAM or the hard disk unit stores a computer program, and the server 100 performs its function by the microprocessor operating according to the computer program.

Each component of the server 100 will now be described.

(1) ID Storage Unit 103

The ID storage unit 103 stores a server ID that is unique to the server 100. The server ID is a code systematically assigned by the device registration system 1.

In this specification, when each server ID needs to be distinguished from one another, the server IDs of the servers 100a-100d may be described as "ID_31a", "ID_31b", "ID_41c", and "ID_41d", respectively. Alternatively, the server IDs of the servers 100a and 100b that belong to the group 300 may be described as "ID_31", while the server IDs of the servers 100c and 100d that belong to the group 400 may be described as "ID_41".

The number "3" or "4" included in each ID above is a group identifier of the group to which a corresponding server belongs.

Note that the server IDs may be Media Access Control (MAC) addresses or Internet Protocol (IP) addresses. Alternatively, the server IDs may be codes assigned systematically by the device registration system 1 uniquely to each server. In this description, a server ID is stored in association with a group identifier of the group to which the server belongs.

(2) Timer Unit 119

The timer unit 119 clocks a date-time and outputs the clocked date-time to the registration unit 109 and the communication unit 118.

(3) Registered Device List Storage Unit 107, Registration Information Storage Unit 108, Registration Unit 109

The registration information storage unit 108 is a tamper-resistant area that cannot be viewed from outside, and stores registration information shown in FIG. 3. The registration information is composed of MAXIMUM NO., REGISTERED NO., REMAINING NO., and PASSWORD. MAXIMUM NO. shows the maximum number of devices registerable with the server 100. REGISTERED NO. shows the number of devices currently registered with the server 100. REMAINING NO. shows the number of devices additionally registerable with the server 100. The PASSWORD is predetermined for the server 100.

The registered device list storage unit 107 is a tamper-resistant area that cannot be viewed from outside, and stores a registered device list shown in FIG. 4. The registered device list shows in columns CLIENT ID, REGISTRATION DATE-TIME, and WITHDRAWAL DATE-TIME for each client once registered with the server 100, so that there are as many rows as the number of clients having been registered.

CLIENT ID is an area storing an ID of a client registered with the server 100. REGISTRATION DATE-TIME is an area storing a date-time at which the client identified by the client ID is registered with the server 100. In the example shown in FIG. 4, a registration date and a registration time are joined with a hyphen. WITHDRAWAL DATE-TIME is a date and time at which the client withdrew from the server. In the case where the client is currently in the group, the withdrawal date-time is six 0s and four 0s that are hyphenated. For the sake of simplicity this specification, the withdrawal date-time having such a value (six 0s and four 0s that are hyphenated) is expressed simply as "0". When a registered client withdraws, the registration unit 109 records the date-time of withdrawal. The row corresponding to the withdrawn client is deleted from the registered device list when the server exchanges the registered device lists with the other server that belongs to the same group to keep the consistency of the lists.

Under the control of the control unit 101, the registration unit 109 conducts processing of client registration, client withdrawal, and registration inquiry. The registration inquiry is processing to check, at the time when transmission of a content or withdrawal of a client is requested, whether the client issued such a request is registered with the server 100.

The client registration processing and the registration inquiry processing require password authentication to be performed. The server 100 receives a password from the client 200 along with a registration request, and judges whether the received password matches the password included in the registration information. When the passwords do not match, the server 100 terminates the processing. When the passwords match, on the other hand, the server 100 continues the processing.

In the registration processing, when the client is not yet registered, the registration unit 109 acquires a registration date-time from the timer unit 119. The registration unit 109 then registers a client ID in the registered device list and also registers the acquired registration date-time in the same row as the client ID. In the withdrawal date-time, "0" is recorded. Further, the registration unit 109 updates the registration information by adding "1" to the registered number and subtracting "1" from the remaining number.

In the withdrawal processing, the registration unit 109 acquires a date-time from the timer unit 119, and records the acquired date-time in a corresponding row of the registered device list. Further, the registration unit 109 updates the registration information by subtracting "1" from the registered number and adding "1" to the remaining number.

In the registration inquiry processing, the registration unit 109 checks whether the ID of the client that issued the request is registered in the registered device list.

Operations of each processing will be described later in detail.

(4) Secret Key Storage Unit 104, Public Key Certificate Storage Unit 105, Public Key Cipher Processing Unit 106, CRL Storage Unit 121

The public key certificate storage unit 105 stores a public key certificate Cert_1.

The public key certificate Cert_1 certifies that a public key PK_1 is a legitimate public key of the server 100. The public key certificate Cert_1 includes signature data Sig_CA1, the public key PK_1, and the server ID "ID_1". The signature data Sig_CA1 is generated by a CA (certification authority) applying a signature algorithm S to the public key PK_1 and the server ID "ID_1" stored in the server 100. Here, the CA is a reliable third party authority, and issues public key certificates certifying the legitimacy of the public keys of devices belonging to the device registration system 1. In addition, the signature algorithm S is, as one example, an ElGamal signature over a finite field. Since ElGamal signatures are known in the art, a description is omitted here.

The secret key storage unit 104 is a tamper-resistant area that cannot be viewed from outside, and stores a secret key SK_1 corresponding to the public key PK_1.

The public key cipher processing unit 106 conducts authentication each time the server 100 communicates with another device in a later described manner to establish an SAC (secure authenticated channel). An SAC refers to a safe communication channel that enables encrypted communication. By establishing an SAC, the server 100 authenticates the device at the other end of communication as a legitimate device recognized by the CA. As a result of the authentication, the public key cipher processing unit 106 shares a session key SK.

Note that an SAC may be established through the use of another known technique, such as the DTCP full authentication. According to the full authentication, key sharing and authentication is performed through the use of a challenge-response system based on a combination of an elliptic curve digital signature algorithm and an elliptic curve key sharing.

The public key cipher processing unit 106 outputs the thus shared session key SK to the encryption unit 112 and the decryption unit 113.

The CRL storage unit 121 stores a CRL (Certification Revocation List). The CRL is a list issued by a CA and showing revoked devices. Revoked devices may be devices that have conducted malicious processing and devices whose secret keys have been revealed. It need not be device IDs that are registered in the CRL, but may be the serial numbers of public key certificates held by invalidated devices. The CRL is distributed to devices, for example, via a broadcast, the Internet, or in form of a recording medium such as DVD, so that the devices are allowed to obtain the most recent CRL. The details of CRLs are disclosed in "American National Standards Institute, American National Standard for Financial Services, ANSX 9.57: Public Key Cryptography for the Financial Industry: Certificate Management, 1997".

(5) Content Storage Unit 110, Content Key Storage Unit 111

The content storage unit 110 stores encrypted contents obtained by applying an encryption algorithm E to a content using a content key. In one example, the encryption algorithm E used herein is a DES (Data Encryption Standard) algorithm. Since DES algorithms are known in the art, description is omitted here.

Further, the method for acquiring contents is not the gist of the present invention, and thus description is not given in detail. Briefly speaking, contents are acquired, for example, using the Internet or a broadcast, or from a recording medium such as a DVD.

The content key storage unit 111 receives an encrypted content key K1 from the encryption unit 114, and stores the encrypted content key K1.

(6) Encryption Unit 114, Decryption Unit 115

The encryption unit 114 reads the server ID from the ID storage unit 103 and generates an encryption key EK1 from the server ID. The encryption unit 114 then applies the encryption algorithm E to an acquired content key using the thus generated encryption key EK1, so that an encrypted content key K1 is obtained. The obtained encrypted content key K1 is stored to the content key storage unit 111.

The decryption unit 115 reads the server ID, and generates a decryption key DK1 from the server ID, so that the resulting decryption key DK1 is identical to the encryption key EK1. The decryption unit 115 then reads the encrypted content key K1 from the content key storage unit 111, and applies a decryption algorithm D to the encrypted content key K1 using the generated decryption key DK1, so that a content key is obtained. The decryption unit 115 outputs the obtained content key to the encryption unit 112.

(7) Encryption Unit 112, Decryption Unit 113

The encryption unit 112 receives the session key SK from the public key cipher processing unit 106, and the content key from the decryption unit 115. The encryption unit 112 then applies the encryption algorithm E to the content key using the session key SK, so that an encrypted content key S is obtained. Under the control of the control unit 101, the encryption unit 112 outputs the obtained encrypted content key S to the client 200 via the IO unit 102.

The decryption unit 113 receives the session key SK from the public key cipher processing unit 106. On receiving encrypted data from the registration unit 109, the decryption unit 113 decrypts the encrypted data using the session key SK to obtain decrypted data, and outputs the decrypted data to the registration unit 109.

(8) Communication Unit 118

The communication unit 118 regularly exchanges registered device lists with the other server belonging to the same group to update the registered device lists.

The communication unit 118a of the server 100a receives a registered device list b from the server 100b.

The communication unit 118a conducts the following processing on each row of the registered device lists a and b. For the sake of convenience, the registered device lists a and b may be referred to simply as lists a and b, respectively.

(A) Processing on Row a of Registered Device List a (A1) First, description is given to the case where none of the rows in the list b include a client ID matching a client ID of the row a. In this case, if the withdrawal date-time of the row a is not "0", the row is deleted. On the other hand, if the withdrawal date-time of the row a is "0", the row a remains registered.

(A2) In the case where the list b has a row b1 having a matching client ID, the communication unit 118a conducts the following processing.

(1) If both the withdrawal dates-times in the rows b1 and a are "0", the row having a later registration date-time is registered in the list a.

(2) If the withdrawal date-time in the row b1 is "0" while the withdrawal date-time in the row a is not "0", either of the following is performed. (2-1) The row a is deleted from the list a if the withdrawal date-time in the row a is later than the registration date-time in the row b1. Alternatively, (2-2) the row b1 is registered in the list a instead of the row a if the withdrawal date-time in the row a is earlier than the registration date-time in the row b1.

(3) If neither of the withdrawal dates-times of the rows b1 and a are "0", the row a is deleted from the list a.

(4) If the withdrawal date-time in the row b1 is not "0" while the withdrawal date-time in the row a is "0", either of the following is performed. (4-1) The row a is deleted from the list a if the withdrawal date-time in the row b1 is later than the registration date-time in the row a. Alternatively, (4-2) the row a remains registered if the withdrawal date-time in the row b1 is earlier than the registration date-time in the row a.

(B) Processing on Row b2 of Registered Device List b2

Here, the row b2 is not registered in the list a. In this case, the following processing is performed.

(B1) The row b2 is registered in the list a if the withdrawal date-time in the row b2 is "0".

(B2) The row b2 is not registered in the list a if the withdrawal date-time in the row b2 is not "0".

The communication unit 118a records rows that are deleted through the above processing (A) and (B) in a provisional withdrawal list, and counts the number of the deleted rows as the number of withdrawn clients. Here, rows corresponding to clients withdrawn before the exchange of the registered device lists are not counted. Further, the communication unit 118a records rows that are newly registered in the list a into a provisional registration list, and counts the number of newly registered rows as the number of newly registered clients.

On completion of the above processing for each row of the lists a and b, the communication unit 118 updates the registration information by subtracting the number of withdrawn clients from the registered number and adding the same to the remaining number. Next, in the case where the number of newly registered clients is not greater than the remaining number, the communication unit 118a further updates the registration information by adding the number of newly registered devices to the registered number, and subtracting the same from the remaining number.

On the other hand, in the case where the number of newly registered clients is greater than the remaining number, the communication unit 118a selects as many rows as the maximum number from all the rows of the provisional registration list and the registered device list a in the ascending order of the registration dates-times. The communication unit 118a then registers the selected rows in the list a, and subsequently alters the registered number to the value held as the maximum number and also alters the remaining number to "0". Next, the communication unit 118a informs clients corresponding to non-selected rows that registration is not possible.

The communication unit 118b of the server 100b performs similar processing. As a result, the servers 100a and 100b store identical registered device lists and registration information.

Similarly, the servers 100c and 100d exchange registered device lists to share a list.

(9) Control Unit 101, IO unit 102, Display Unit 116, Input Unit 117

The IO unit 102 performs input from, and output to other devices.

The display unit 116 displays various information under the control of the control unit 101.

The input unit 117 receives an external input and outputs the received input to the control unit 101.

On receiving a registration request, a content transmission request, or a withdrawal request from the client 200 via the IO unit 102, the control unit 101 controls the public key cipher processing unit 106 so as to authenticate the legitimacy of the client 200. When the authentication is successful, the control unit 101 controls the registration unit 109 so as to conduct the registration, inquiry or withdrawal processing.

Further, in the case where a content transmission request is received and the authentication is performed successfully, the control unit 101 controls the decryption unit 115 so as to decrypt the encrypted content key K1, and also controls the encryption unit 112 to obtain an encrypted content key S. Further, the control unit 101 reads an encrypted content from the content storage unit 110, and transmits the encrypted content key S and the encrypted content to the client 200 via the IO unit 102.

Note that transmission of contents is performed in compliance with CCI (Copy Control Information) appended to each content. CCI is two-bit information for restricting copy of the content to which the CCI is appended. With combinations of two bits, CCI shows either of (1) Copy Never: allowing no copy, (2) Copy Once: allowing copy only once, or (3) Copy Freely: allowing unlimited copies.

Here, contents are allowed to be transmitted to a client as long as the client is in the group.

The control unit 101 controls the communication unit 118 to regularly exchange registered device lists with the other server belonging to the group in order to update the registered device lists and registration information.

1.2 Client 200

Figure 5:
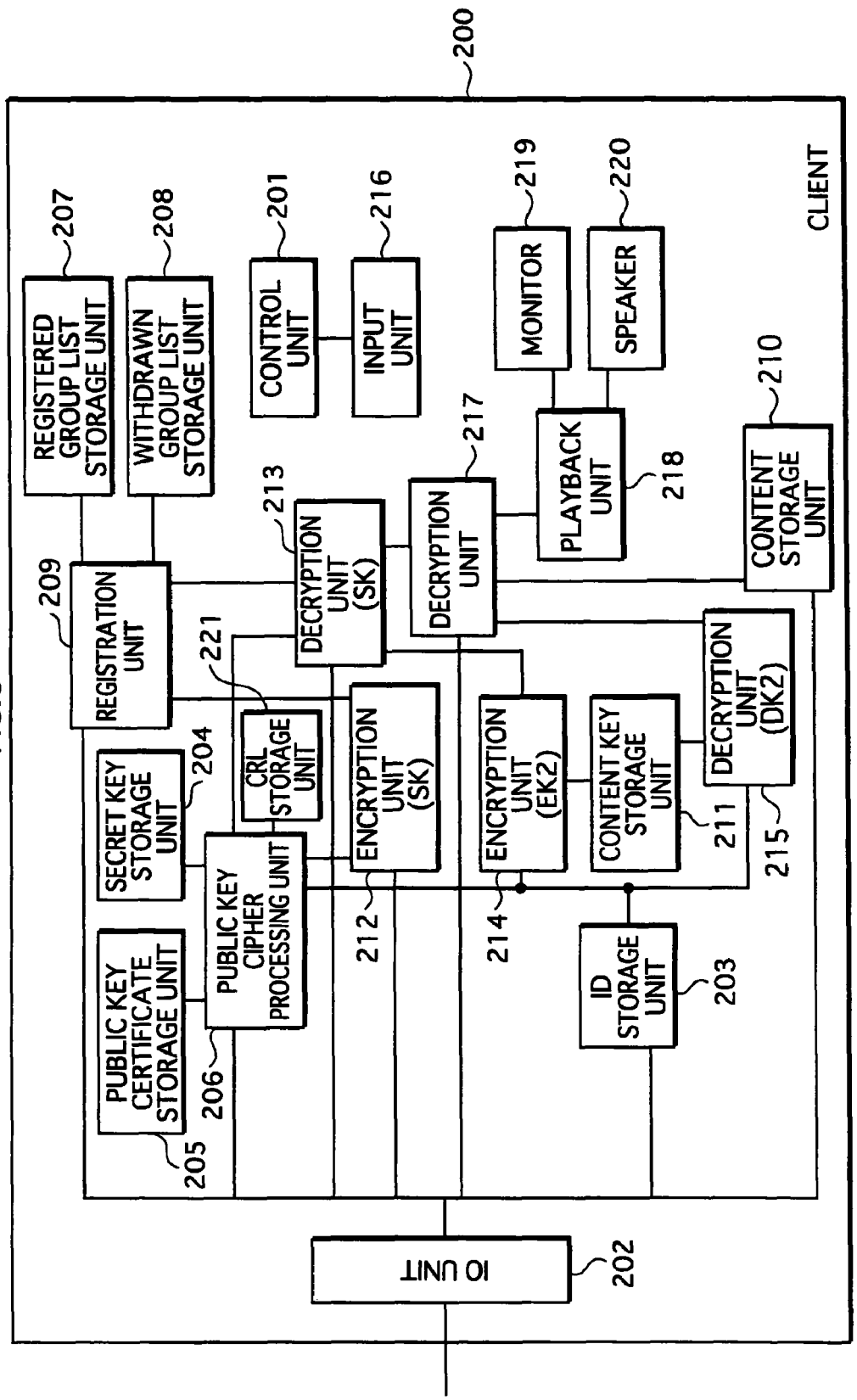
FIG. 5 is a block diagram showing the structure of a client 200.

As shown in FIG. 5, the client 200 is composed of a control unit 201, an IO (input/output) unit 202, an ID storage unit 203, a secret key storage unit 204, a public key certificate storage unit 205, a public key cipher processing unit 206, a registered group list storage unit 207, a withdrawn group list storage unit 208, a registration unit 209, a content storage unit 210, a content key storage unit 211, an encryption unit 212, a decryption unit 213, an encryption unit 214, a decryption unit 215, an input unit 216, a decryption unit 217, a playback unit 218, a monitor 219, a speaker 220, and a CRL (Certification Revocation List) storage unit 221.

The client 200 is specifically a computer system composed generally of a microprocessor, a ROM, a RAM, a hard disk unit, a display unit, a keyboard, and a mouse. The RAM or the hard disk unit stores a computer program, and the client 200 performs its function by the microprocessor operating according to the computer program.

Further, the clients 200e and 200g located in each home may specifically be a playback device for contents, and the client 200f may be a notebook PC, which is portable and provided with a playback function. Here, description is given to the functions required for a client according to the present invention.

Each component of the client 200 will now be described.

(1) ID Storage Unit 203

The ID storage unit 203 stores a client ID "ID_02" that is unique to the client 200. "ID_02" is a code that is assigned systematically by the device registration system 1.

In this specification, when each of the clients 200e, 200f, and 200g needs to be distinguished from one another, the clients 200e-200g are denoted by the client IDs "ID_02e", "ID_02f", and "ID_02g", respectively.

Similarly to the server IDs, the client IDs may be MAC addresses or IP addresses.

(2) Registered Group List Storage Unit 207, Withdrawn Group List Storage Unit 208, Registration Unit 209

The registered group list storage unit 207 is a tamper-resistant area that cannot be viewed from outside, and stores a registered group list shown in FIG. 6. The registered group list is composed of MAXIMUM NO., REGISTERED NO., REMAINING NO., and GROUP ID. MAXIMUM NO. shows the maximum number of groups the client 200 may join in. REGISTERED NO. shows the number of groups that the client 200 is currently in. REMAINING NO. shows the number of groups that the client 200 may additionally join in. GROUP ID shows group IDs each identifying a group that the client 200 is in.

Figure 7:
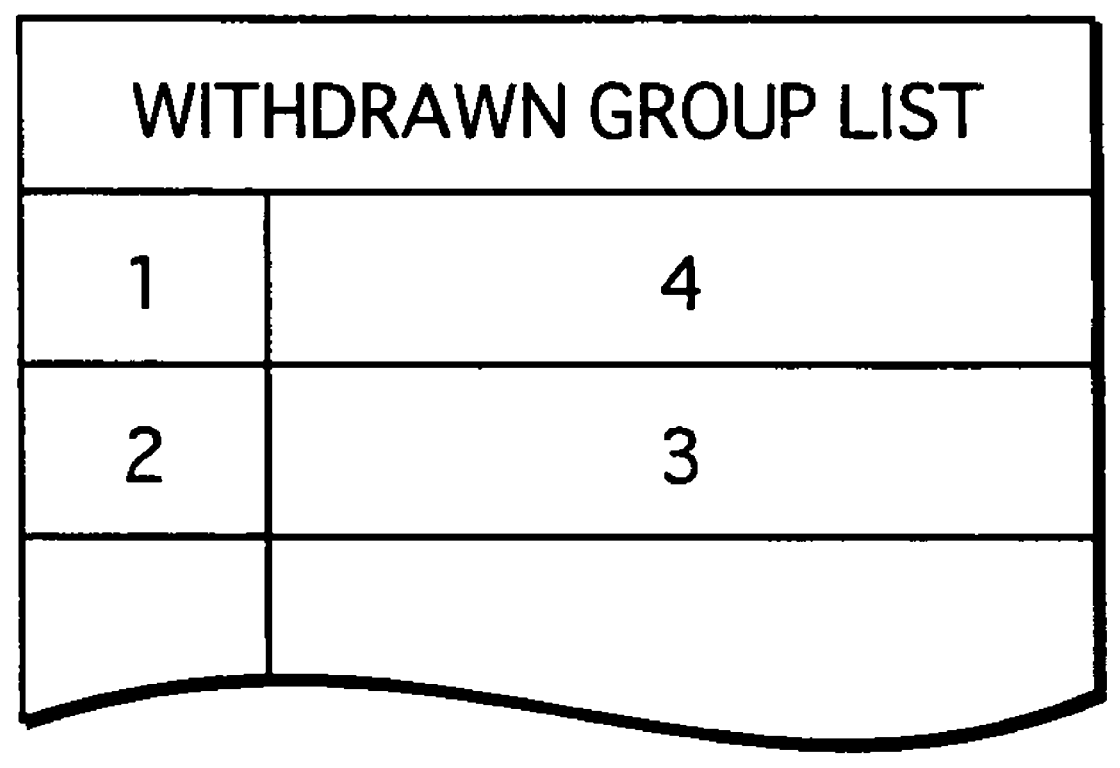

The withdrawn group list storage unit 208 stores a withdrawn group list shown in FIG. 7. The withdrawn group list contains group IDs identifying groups from which the client 200 has withdrawn and the group IDs are listed in the order of withdrawal.

The registration unit 209 conducts processing, under the control of the control unit 201, to register the client 200 with the server 100, to inquire about registration of the client, or to withdraw the client 200 from the server 100.

When the client 200 is registered with a server that belongs to the group 300 as a result of the registration processing, the registration unit 209 receives a notification of registration completion. On receipt of the notification, the registration unit 209 updates the registered group list by adding "1" to the registered number, and subtracting "1" from the remaining number. Further, the registration unit 209 extracts group identification information from the server ID of the server with which the client 200 is registered, and additionally registers the extracted group identification information as a group ID in the registered group list.

When the client 200 withdraws from the server 100 as a result of the withdrawal processing, the registration unit 209 receives a notification of withdrawal completion. On receipt of the notification, the registration unit 209 deletes from the registered group list, a group ID that matches group identification information included in a server ID transmitted in the notification, and registers the deleted group ID in the withdrawn group list. Further, the registration unit 209 updates the registered group list by subtracting "1" from the registered number and adding "1" to the remaining number. Note that it is not necessary to register the group ID in the withdrawn group list in the case where the group ID is the same as the group ID registered in the last row of the withdrawn group list in order to avoid redundancy.

Operations of the registration processing, registration inquiry processing, and withdrawal processing will be described later in detail.

(3) Secret Key Storage Unit 204, Public Key Certificate Storage Unit 205, Public Key Cipher Processing Unit 206, CRL Storage Unit 221

The CRL storage unit 221 stores the most current CRL.

The public key certificate storage unit 205 stores a public key certificate Cert_2 issued by the CA. The public key certificate Cert_2 includes a public key PK_2 and the client ID "ID_02" of the client 200, and signature data Sig_CA2 generated by the CA from the public key PK_2 and "ID_02".

The secret key storage unit 204 is a tamper-resistant area that cannot be viewed from outside, and stores a secret key SK_2 corresponding to the public key PK_2.

At a time when the client 200 communicates with the server 100, the public key cipher processing unit 206 performs, under the control of the control unit 201, authentication to establish an SAC. As a result of the authentication, the public key cipher processing unit 206 shares the session key SK.

The public key cipher processing unit 206 then outputs the session key SK to the encryption unit 212 and the decryption unit 213.

(4) Content Storage Unit 210, Content Key Storage Unit 211

The content storage unit 210 stores an encrypted content that is obtained by encrypting a content using a content key.

The content key storage unit 211 receives an encrypted content key K2 from the encryption unit 214 and stores the received encrypted content key K2.

Note that the client 200 is prohibited from transmitting contents obtained from the server 100 to another device or recording such contents onto a portable recording medium.

(5) Encryption Unit 212, Decryption Unit 213

Under the control of the control unit 201, the decryption unit 213 receives the session key SK from the public key cipher processing unit 206 and also receives encrypted data from the registration unit 209. The decryption unit 213 then applies a decryption algorithm D using the session key SK to the encrypted data to obtain decrypted data, and outputs the decrypted data to the registration unit 209.

Further, on receipt of the encrypted content key S from the server 100 via the IO unit 202, the decryption unit 213 applies the decryption algorithm D to the encrypted content key S to obtain a content key. When a content is to be played back, the decryption unit 213 outputs the content key to the decryption unit 217. When a content is to be stored, the decryption unit 213 outputs the obtained content key to the encryption unit 214.

Under the control of the control unit 201, the encryption unit 212 receives the session key SK from the public key cipher processing unit 206. Further, on receipt of data from the registration unit 209, the encryption unit 212 applies the encryption algorithm E using the session key SK to the received data, and outputs the encrypted data to the server 100 via the IO unit 202.

(6) Encryption Unit 214, Decryption Unit 215

Under the control of the control unit 201, the encryption unit 214 reads "ID_02" from the ID storage unit 203, and generates an encryption key EK2 from "ID_02". Further, on receipt of the content key from the decryption unit 213, the encryption unit 214 applies the encryption algorithm E using the generated encryption key EK2 to the received content key, so that an encrypted content key K2 is obtained. The encryption unit 214 then outputs the encrypted content key K2 to the content key storage unit 211.

Under the control of the control unit 201, the decryption unit 215 reads "ID_02" from the ID storage unit 203, and generates a decryption key DK2 from "ID_02". The decryption unit 215 then reads the encrypted content key K2 from the content key storage unit 211, and applies the decryption algorithm D using the decryption key DK2 to the read encrypted content key K2, so that a content key is obtained. The obtained content key is outputted to the decryption unit 217.

(7) Decryption Unit 217

Under the control of the control unit 201, the decryption unit 217 receives the content key from the decryption unit 213 or 215, and reads the encrypted content from the content storage unit 210. The decryption unit 217 then applies the decryption algorithm D using the content key to the read encrypted content, so that a content is obtained. The thus obtained content is outputted to the playback unit 218.

(8) Playback Unit 218, Monitor 219, Speaker 220

Under the control of the control unit 201, the playback unit 218 generates video signals and audio signals from the content that is received from the decryption unit 217, and outputs the generated video signals and audio signals to the monitor 219 and the speaker 220, respectively.

(9) Control Unit 201, Input Unit 216

The input unit 216 receives external input, and outputs the received input to the control unit 201.

On receiving an input via the input unit 216 to request registration of the client, transmission of a content, or withdrawal of the client, the control unit 201 controls the public key cipher processing unit 206 so as to perform mutual authentication with the server 100. When the authentication fails, the processing is terminated. When the authentication is successful, on the other hand, the control unit 201 controls the registration unit 209, so that the registration or withdrawal processing is performed.

On receiving an input via the input unit 216 to acquire and play back a content, the control unit 201 controls the registration unit 209 so as to perform the registration inquiry processing. On the client 200 receiving the encrypted content key S and the encrypted content from the server 100 via the IO unit 202, the control unit 201 controls the decryption unit 213 to decrypt the encrypted content key S, and controls the decryption unit 217 to decrypt the encrypted content using the decrypted content key, so that a content is obtained. Finally, the control unit 201 controls the playback unit 218 to play back the content.

On receiving an input via the input unit 216 to acquire a content and to store the acquired content, the client 200 receives the encrypted content key S and the encrypted content from the server 100 in a similar manner to the above. In succession, the control unit 201 stores the encrypted content to the content storage unit 210. Further, the control unit 201 controls the decryption unit 213 to decrypt the encrypted content key S, and controls the encryption unit 214 to encrypt the content key using the encryption key EK2. Finally, the control unit 201 stores the thus encrypted content key K2 to the content key storage unit 211.

On receiving an input via the input unit 216 to play back a content, the control unit 201 reads the encrypted content key K2 from the content key storage unit 211, and controls the decryption unit 215 to decrypt the encrypted content key K2 using the decryption key DK2. Next, the control unit 201 reads the encrypted content from the content storage unit 210, controls the decryption unit 217 to decrypt the encrypted content using the thus decrypted content key, and controls the playback unit 218 to play back the decrypted content.

Note that transmission, playback, and storage of contents are performed in compliance with CCI appended to each content. That is to say, when CCI appended to an acquired content allows playback but prohibits copying of the content, the client 200 is prohibited from storing the content.

In order to communicate with the servers 100a-100d, the client 200 holds their IP addresses or URLs or accesses an external server to receive the IP addresses or the URLs. Yet, description thereof is omitted as the technique is not the gist of the present invention.

2. OPERATIONS OF DEVICE REGISTRATION SYSTEM 1

2.1 SAC Establishment

Figure 8:
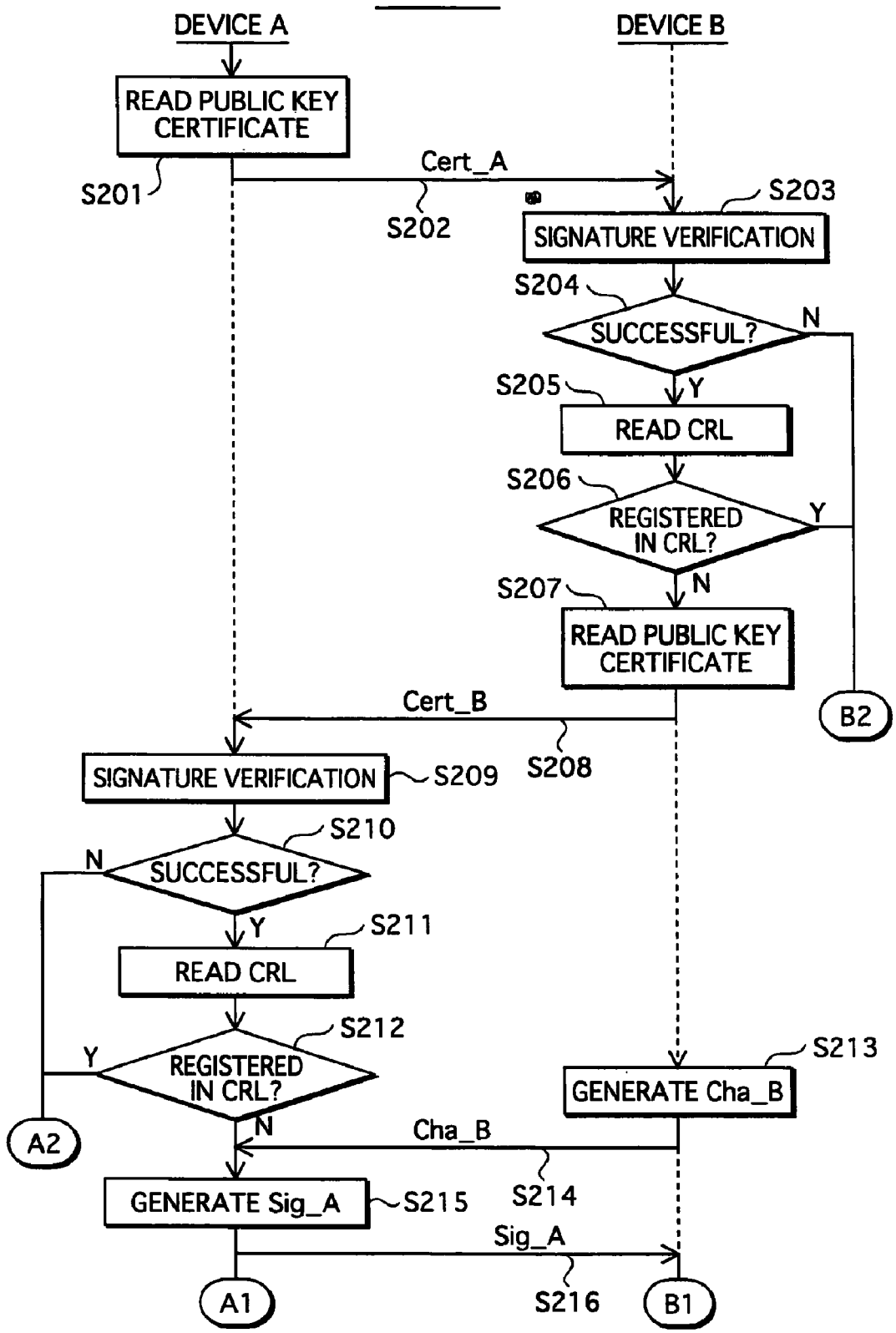
FIG. 8 is a flowchart showing SAC establishment operations (continued to FIG. 9)
Figure 9:
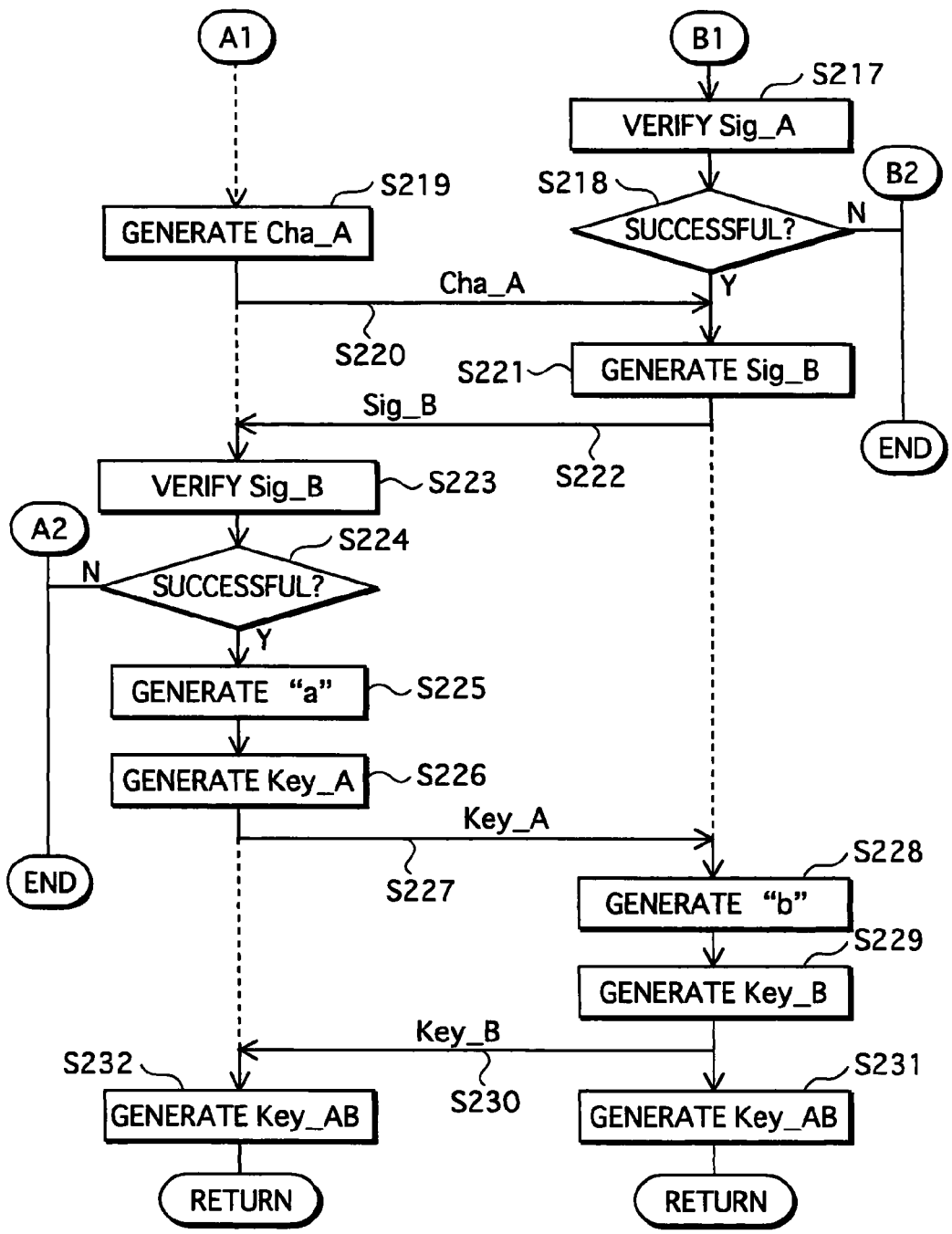
FIG. 9 is a flowchart showing the SAC establishment operations (continued from FIG. 8)

Now, description is given to operations performed at a time of establishing an SAC with reference to FIGS. 8 and 9.

Note that the SAC establishment described herein is an example, and may be performed according to another authentication or key sharing scheme. Further, since the SAC establishment is used in the mutual authentication between any of the devices mentioned above, the devices conducting authentication here are referred to simply as devices A and B.

Here, Gen( ) denotes a key generation function and Y denotes a parameter unique to the device registration system 1. The key generation function Gen( ) satisfies a relation:

$$\mathrm{Gen}(x,\mathrm{Gen}(z,Y))=\mathrm{Gen}(z,\mathrm{Gen}(x,Y)).$$

Since the key generation function is realized using arbitrary known technology, the details of the function is will not be given. As one example, a Diffie-Hellman (DH) public key delivery method is disclosed in "Modern Cryptosystems (Gendai Ango Riron)" by Shinichi IKENO and Kenji KOYAMA (published by Institute of Electronics, Information and Communication Engineers).

First, the device A reads a public key certificate Cert_A (step S201), and transmits the read public key certificate Cert_A to the device B (step S202).

On receiving the public key certificate Cert_A, the device B conducts signature verification by applying a signature verification algorithm V using a public key PK_CA of the CA to signature data Sig_CA that is included in the public key certificate Cert_A (step S203). If the verification is not successful (step S204, N), the processing is terminated. If the verification is successful (step S204, Y), the device B reads a CRL (step S205), and judges whether "ID_A" included in the received public key certificate Cert_A is registered in the CRL (step S206). If registered (step S206, Y), the processing is terminated. If not registered (step S206, N), the device B reads a public key certificate Cert_B of the device B (step S207), and transmits the read public key certificate Cert_B to the device A (step S208).

On receiving the public key certificate Cert_B, the device A conducts signature verification by applying the signature verification algorithm V using public key PK_CA to signature data Sig_CA included in the received public key certificate Cert_B (step S209). If the verification is not successful (step S210, N), the processing is terminated. If the verification is successful (step S210, Y), the device A reads a CRL (step S211), and judges whether "ID_B" included in the received public key certificate Cert_B is registered in the CRL (step S212). If registered (step S212, Y), the processing is terminated. If not registered (step S212, N), the processing is continued.

The device B generates a random number Cha_B (step S213), and transmits the generated random number Cha_B to the device A (step S214).

On receiving the random number Cha_B, the device A applies the signature generation algorithm S using the secret key SK_A of the device A to the received random number Cha_B, so that signature data Sig_A is generated (step S215). The device A then transmits the generated signature data Sig_A to the device B (step S216).

On receiving the signature data Sig_A, the device B conducts signature verification by applying the signature verification algorithm V to the received signature data Sig_A, using the public key PK_A included in the public key certificate Cert_A received in the step S202 (step S217). If the verification is not successful (step S218, N), the processing is terminated. If the verification is successful (step S218, Y), the processing is continued.

The device A generates a random number Cha_A (step S219), and transmits the generated random number Cha_A to the device B (step S220).

The device B applies the signature generation algorithm S to the received random number Cha_A, using the secret key SK_B of the device B, so that signature data Sig_B is generated (step S221). The device B then transmits the generated signature data Sig_B to the device A (step S222).

On receiving the signature data Sig_B, the device A conducts signature verification by applying the signature verification algorithm V to the signature data Sig_B, using the public key PK_B included in the public key certificate Cert_B received in the step S208 (step S223). If verification is not successful (step S224, N), the processing is terminated. If the verification is successful (step S224, Y), the device A generates a random number "a" (step S225), generates Key_A=Gen(a,Y) using the generated random number "a" (step S226), and transmits the generated Key_A to the device B (step S227).

On receiving Key_A, the device B generates a random number "b" (step S228), and generates Key_B=Gen(b,Y) using the generated random number "b" (step S229). The device B transmits the generated Key_B to the device A (step S230). Also, the device B generates Key_AB=Gen(b, Key_A)=Gen(b, Gen(a,Y)) using the generated random number "b" and the received Key_A (step S231), and designates the thus generated Key_AB as a session key SK.

On receiving Key_B, the device A generates Key_AB=Gen (a, Key_B)=Gen(a, Gen(b, Y)) using the generated random number "a" and the received Key_B (step S232), and designates the thus generated Key_AB as a session key SK.

As described above, before communicating to each other, the two devices mutually authenticate each other and share the session key SK.

2.2 Registration

Figure 10:
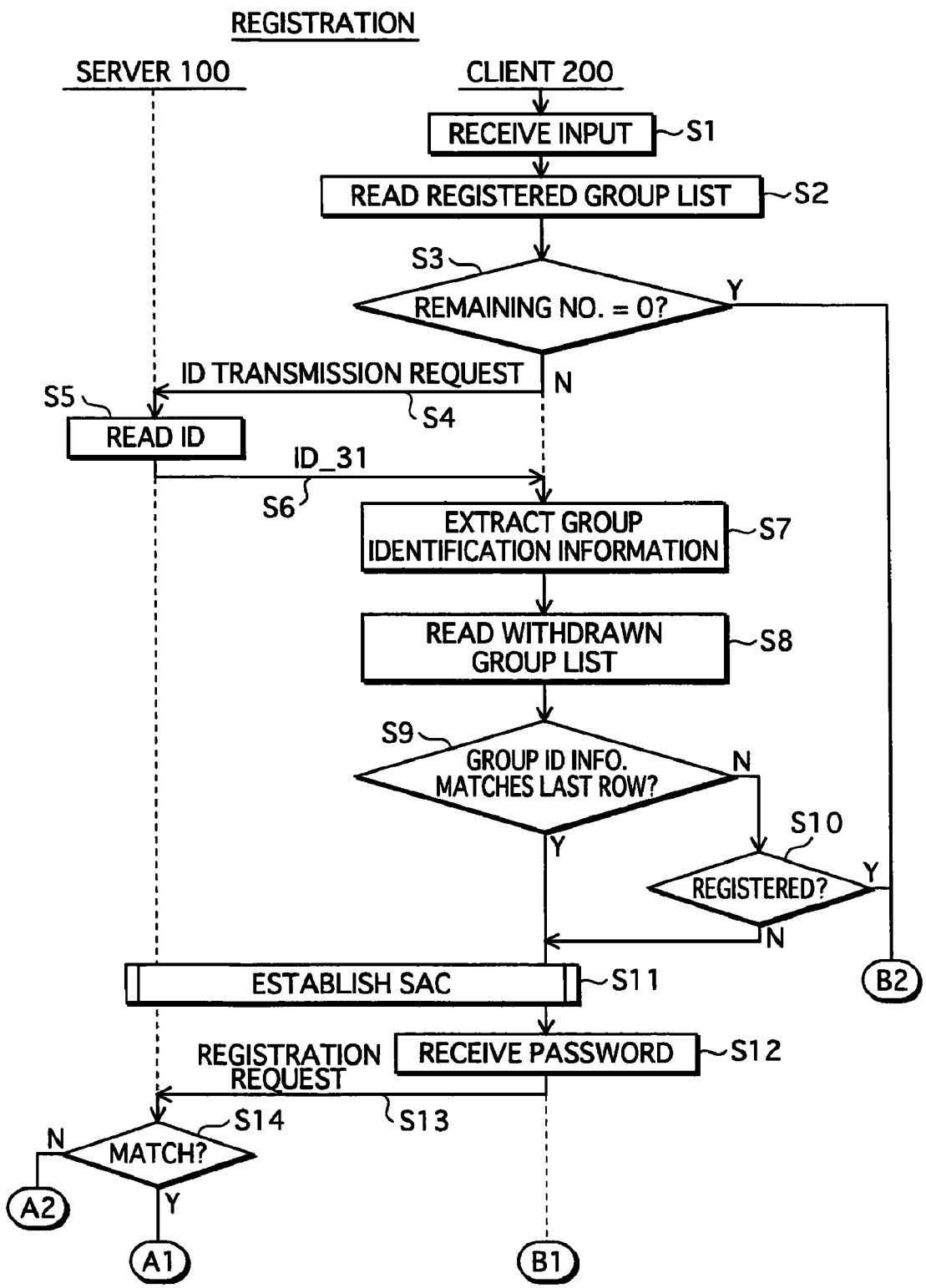
FIG. 10 is a flowchart showing operations for registering a client with a server (continued to FIG. 11)
Figure 11:
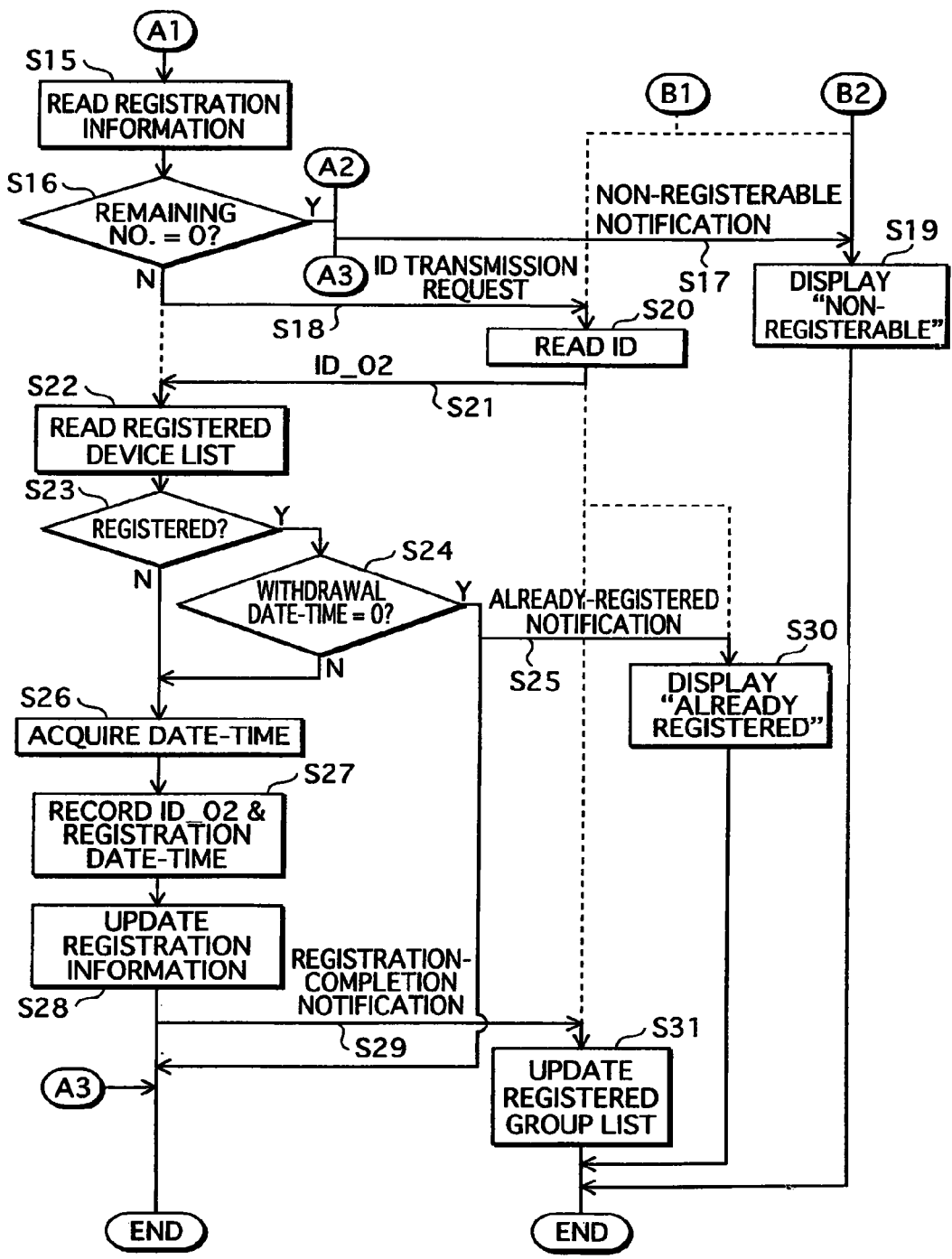
FIG. 11 is a flowchart showing the operations for registering a client with a server (continued from FIG. 10)

Now, description is given with reference to FIGS. 10 and 11 to operations performed at a time when the server 100a or 100b registers the client 200.

On the input unit 216 receiving an input requesting registration processing to be performed (step S1), the registration unit 209 reads a registered group list under the control of the control unit 201 (step S2), and judges whether the remaining number is "0" (step S3). If the remaining number is "0" (step S3, Y), it is no longer permissible for the client 200 to additionally register in any group. Consequently, the control unit 201 controls the monitor 219 to display the fact that registration is not possible (step S19), and terminates the processing.

If the remaining number is not "0" (step S3, N), the registration unit 209 transmits an ID transmission request to the server 100 (step S4).

On receiving the ID transmission request, the control unit 101 reads the server ID, which in this case is "ID_31", from the ID storage unit 103 (step S5), and transmits "ID_31" to the client 200 (step S6).

On receiving "ID_31", the registration unit 209 of the client 200 extracts group identification information from "ID_31" (step S7). The registration unit 209 then reads a withdrawn group list from the withdrawn group list storage unit 208 (step S8), and judges whether the extracted group identification information matches the group ID in the last row of the list (step S9). If not matched (step S9, N), the registration unit 209 further judges whether the extracted group identification information is registered anywhere in the withdrawn group list (step S10). If registered in the withdrawn group list (step S10, Y), the client 200 was once registered with the server 100 and thus is not registerable again. Consequently, the monitor 219 displays that registration is not possible (step S19), and the processing is terminated.

If the extracted group identification matches (step S9, Y) or is not registered in the withdrawn group list (step S10, N), an SAC is established between the public key cipher processing unit 106 and the public key cipher processing unit 206, so that the session key SK is shared (step S11). When an SAC is failed to be established, the processing is terminated.

Once the SAC is established, the server 100 transmits data after encrypting the data by the encryption unit 112 using the session key SK. Further, when data encrypted using the session key SK is received from the client 200, the decryption unit 113 decrypts the received data using the session key SK, and outputs the decrypted data to the registration unit 109. Similarly, the client 200 performs encryption and decryption of data using the session key by the encryption unit 212 and the decryption unit 213, respectively.

On the SAC establishment, the client 200 receives an input of a password via the input unit 216 (step S12), and transmits a registration request that includes the password to the server 100 (step S13).

The registration unit 109 judges whether the received password matches the password included in the registration information (step S14). If not matched (step S14, N), the registration unit 109 transmits to the client 200, a notification that the registration is not possible (step S17), and the processing is terminated. If matched (step S14, Y), the registration unit 109 reads the registration information from the registration information storage unit 108 (step S15), and judges whether the remaining number is "0" (step S16). If the remaining number is "0" (step S16, Y), the registration unit 109 transmits to the client 200, a notification that the registration is not possible (step s17), and the processing is terminated. If the remaining number is not "0" (step S16, N), the registration unit 109 transmits an ID transmission request to the client 200 (step S18).

On receiving the notification that the registration is not possible, the registration unit 209 of the client 200 displays on the monitor 219 the fact that the registration is not possible (step S19), and the processing is terminated. On receiving the ID transmission request, on the other hand, the registration unit 209 reads "ID_02" from the ID storage unit 203 (step S20), and transmits "ID_02" to the server 100 (step S21).

On receiving "ID_02", the registration unit 109 of the server 100 reads the registered device list from the registered device list storage unit 107 (step S22), and judges whether "ID_02" is registered in the list as a client ID (step S23). If registered (step S23, Y), the registration unit 109 further judges whether the withdrawal date-time in the row of the matching client ID is "0" (step S24). If the withdrawal date-time is "0" (step S24, Y), the registration unit 109 transmits to the client 200, a notification that the client 200 is already registered (step S25), and the processing is terminated. If the withdrawal date-time is not "0" (step S24, N) or "ID_02" is not in the registered device list (step S23, N), the registration unit 109 acquires a date-time from the timer unit 119 (step S26). The registration unit 109 then writes "ID_02", the acquired date-time as the registration date-time, and "0" as the withdrawal date-time in the registered device list (step S27), so that the client 200 is registered with the server 100. Further, the registration unit 109 updates the registration information by adding "1" to the registered number and subtracting "1" from the remaining number (step S28). On completing the above steps, the registration unit 109 transmits to the client 200, a notification informing completion of the registration (step S29), and the processing is terminated.

On receiving the notification that the client 200 is already registered, the registration unit 209 displays on the monitor 219 the fact that the client 200 is already registered (step S30), and the processing is terminated. On receiving the notification informing completion of the registration, on the other hand, the registration unit 209 updates the registered group list by additionally registering the group identification information extracted in the step S7 as a group ID, adding "1" to the registered number, and subtracting "1" from the remaining number (step S31), and the processing is terminated.

Note that the client 200 performs similar processing when registering with the server 100c or 100d.

2.3 Inquiry

Figure 12:
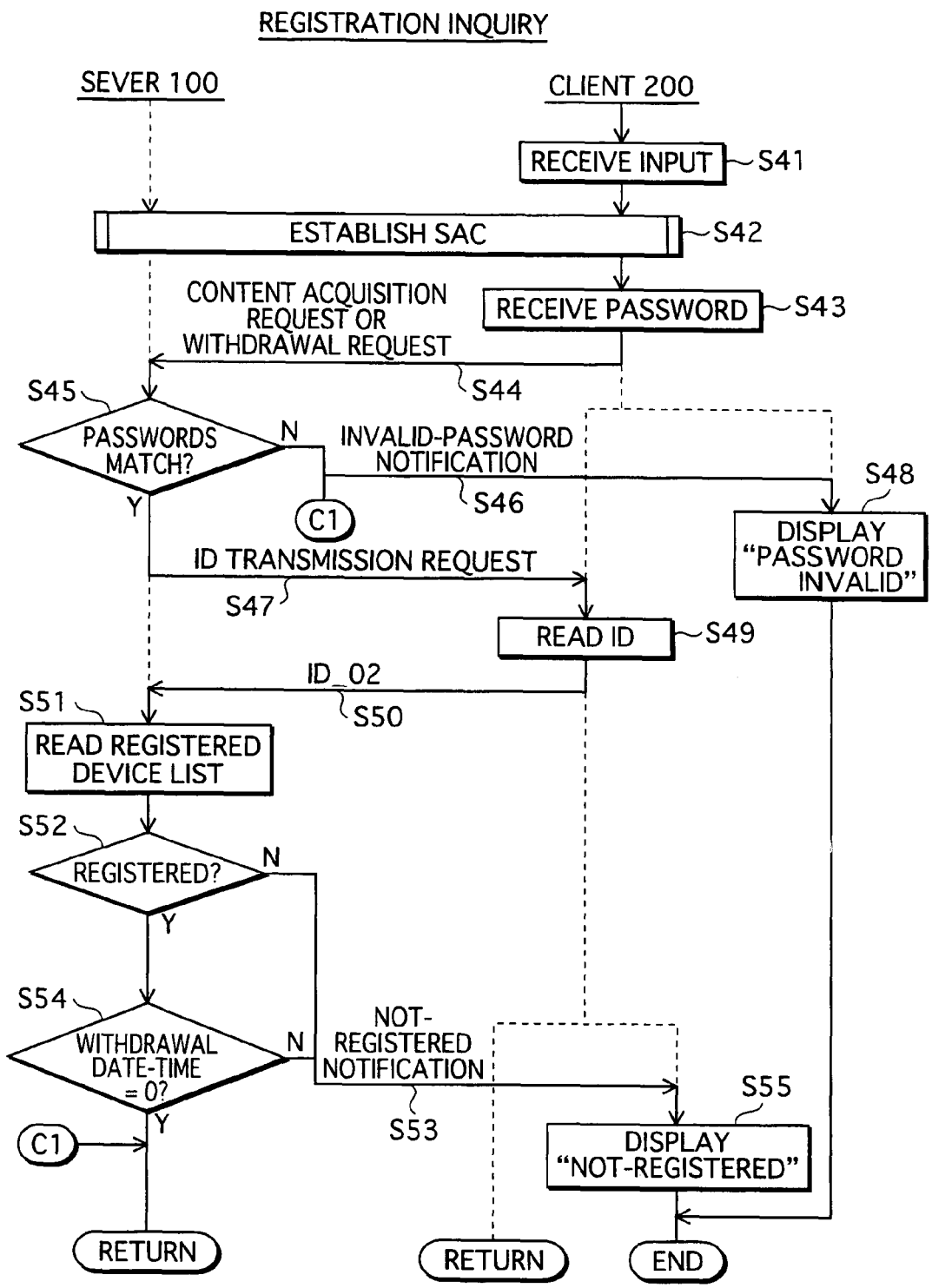
FIG. 12 is a flowchart showing operations for making an inquiry as to whether a client is registered.

Now, description is given to operations performed at a time of inquiring as to whether the client is registered with the server 100 with reference to FIG. 12. Such an inquiry is made when a content is to be distributed or when the client is to withdraw.

On the input unit 216 receiving an input requesting content transmission or withdrawal of the client 200 (step S41), the public key cipher processing units 106 and 206 establish an SAC (step S42). If the SAC establishment fails, the processing is terminated. Once an SAC is established, communication thereafter is performed all in encrypted form.

When the SAC is successfully established, the input unit 216 receives an input of a password (step S43), and the registration unit 209 transmits to the server 100, a content transmission request or a withdrawal request each including the password (step S44).

On receiving a content transmission request or a withdrawal request, the registration unit 109 of the server 100 judges whether the password included in the request matches the password included in the registration information (step S45). If not matched (step S45, N), the registration unit 109 transmits to the client 200, a notification that the inputted password is invalid (step S46), and the processing is terminated.

If the passwords match (step S45, Y), the registration unit 109 transmits an ID transmission request to the client 200 (step S47).

On receiving the notification that the inputted password is invalid, the registration unit 209 displays on the monitor 219 the fact that the inputted password is invalid (step S48), and the processing is terminated.

On receiving the ID transmission request, the registration unit 209 reads "ID_02" from the ID storage unit 203 (step S49), and transmits "ID_02" to the server 100 (step S50).

On receiving "ID_02", the registration unit 109 reads the registered device list from the registered device list storage unit 107 (step S51), and judges whether "ID_02" is registered in the registered device list (step S52). If not registered (step S52, N), the registration unit 109 transmits to the client 200, a notification that the client 200 is not registered (step S53). If registered (step S52, Y), the registration unit 109 further judges whether the withdrawal date-time corresponding to "ID_02" is "0" (step S54). If the withdrawal date-time is not "0" (step S54, N), the registration unit 109 transmits to the client 200, a notification that the client 200 is not registered (step S53). If the withdrawal date-time is "0" (step S54, Y), the processing is continued.

On receiving the notification that the client 200 is not registered, the monitor 219 displays the fact that the client 200 is not registered (step S55), and the processing is terminated.

Through the above operations, an inquiry is made to the server 100 as to whether the client 200 is registered with the server 100, and the content transmission or the withdrawal processing is performed thereafter.

2.4 Content Transmission (1) Playback of Content

Figure 13:
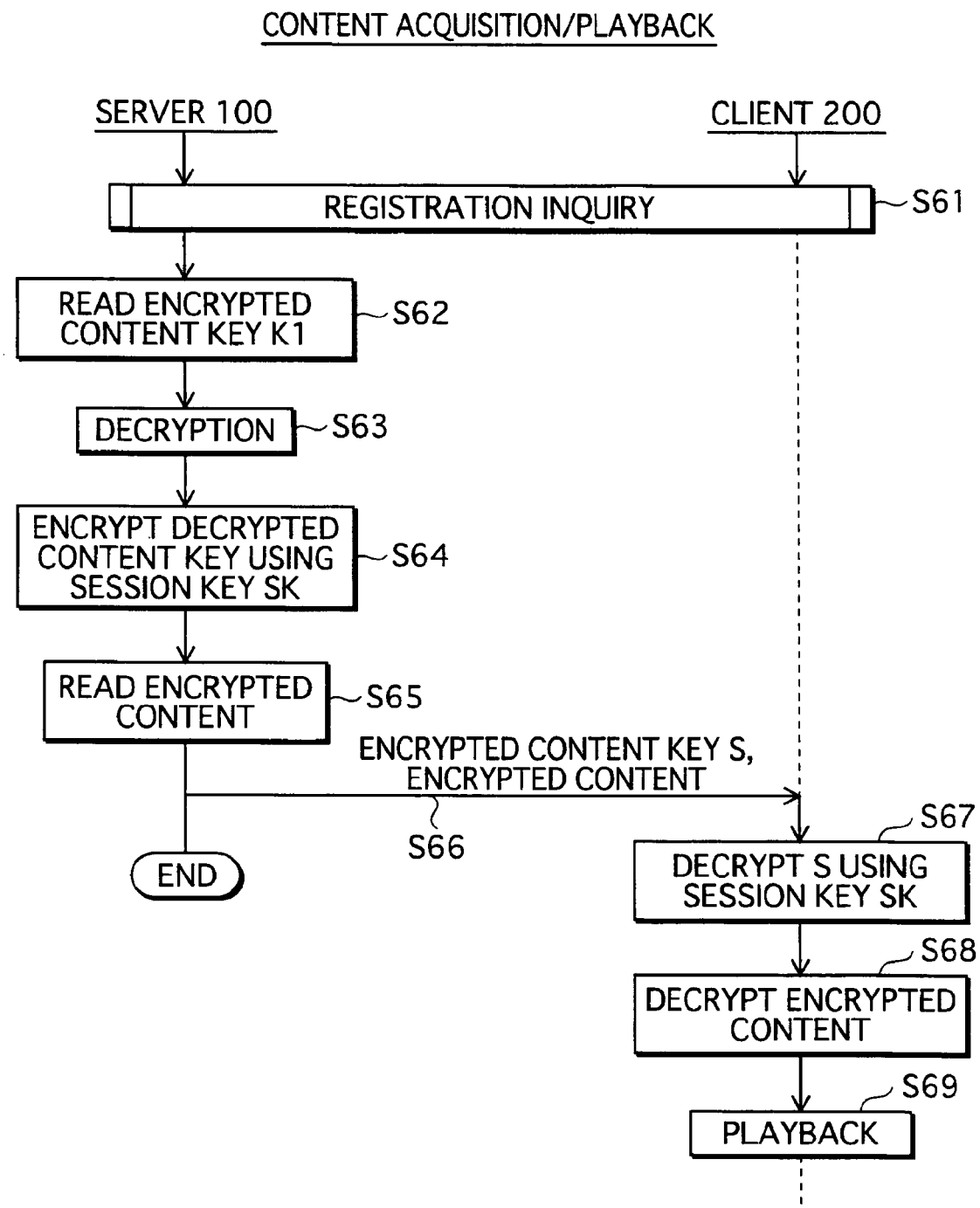
FIG. 13 is a flowchart showing operations for transmitting a content from a server to a client.

First, description is given with reference to FIG. 13 to operations performed to acquire a content from the server 100 and view the acquired content.

On the input unit 216 receiving an input requesting content transmission, the client 200 performs the above inquiry processing as to whether the client 200 is registered with the server 100 (step S61).

If registered, the decryption unit 115 of the server 100 reads the encrypted content key K1 from the content key storage unit 111 (step S62), decrypts the encrypted content key K1 using the decryption key DK1 (step S63) to obtain a content key, and outputs the content key to the encryption unit 112. The encryption unit 112 encrypts the content key using the session key SK received from the public key cipher processing unit 106 to obtain an encrypted content key S (step S64). The control unit 101 reads an encrypted content from the content storage unit 110, and transmits the encrypted content key S and the encrypted content to the client 200 (step S66).

The decryption unit 213 of the client 200 decrypts the encrypted content key S using the session key SK received from the public key cipher processing unit 206 (step S67), and outputs the content key to the decryption unit 217. The decryption unit 217 receives the encrypted content and also receives the content key from the decryption unit 213. The decryption unit 217 then decrypts the encrypted content using the received content key to obtain a content (step S68), and outputs the obtained content to the playback unit 218. The playback unit 218 plays back the content via the monitor 219 and the speaker 220 (step S69).

(2) Playback of Content after Storing

Figure 14:
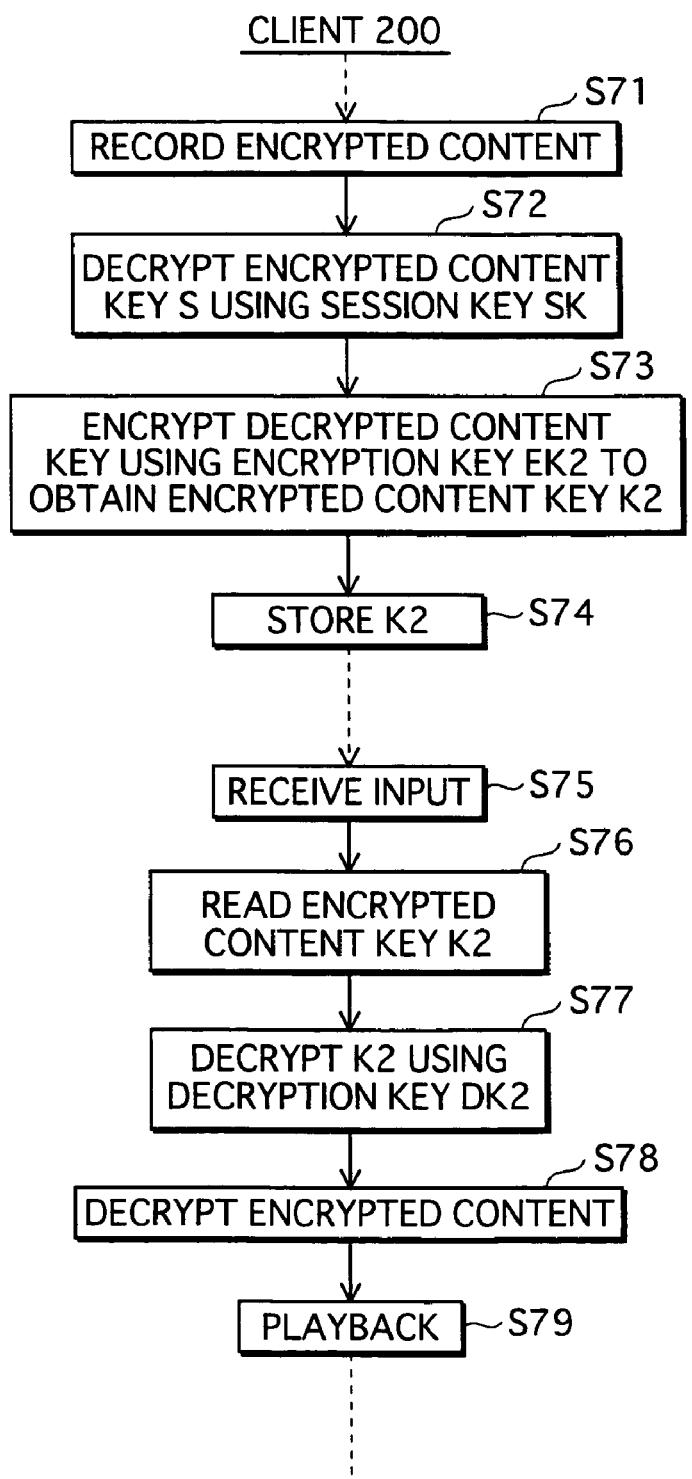
FIG. 14 is a flowchart showing operations for a client to store an acquired content.

Now, description is given with reference to FIG. 14 to operations performed to store a content and later playback the stored content.

On the input unit 216 receiving a request to acquire and store a content, the client 200 performs the above steps S61-S66 in conjunction with the server 100, so that a content is acquired.

On the client 200 receiving the encrypted content key S and the encrypted content, the control unit 201 stores the encrypted content to the content storage unit 210 (step S71). The decryption unit 213 decrypts the encrypted content key S using the session key SK received from the public key cipher processing unit 206 to obtain a content key (step S72), and outputs the obtained content key to the encryption unit 214. The encryption unit 214 encrypts the content key using the encryption key EK2 to obtain an encrypted content key K2 (step S73), and stores the encrypted content key K2 to the content key storage unit 211 (step S74).

Thereafter, on the input unit 216 receiving an input requesting playback of the stored content (step S75), the decryption unit 215 reads the encrypted content key K2 from the content key storage unit 211 (step S76), decrypts the encrypted content key K2 using the decryption key DK2 to obtain a content key (step S77), and outputs the obtained content key to the decryption unit 217. The decryption unit 217 reads the encrypted content from the content storage unit 210, and decrypts the read encrypted content using the content key, and outputs the decrypted content to the playback unit 218 (step S78). The playback unit 218 plays back the content via the monitor 219 and the speaker 220 (step S79).

2.5 Withdrawal

Figure 15:
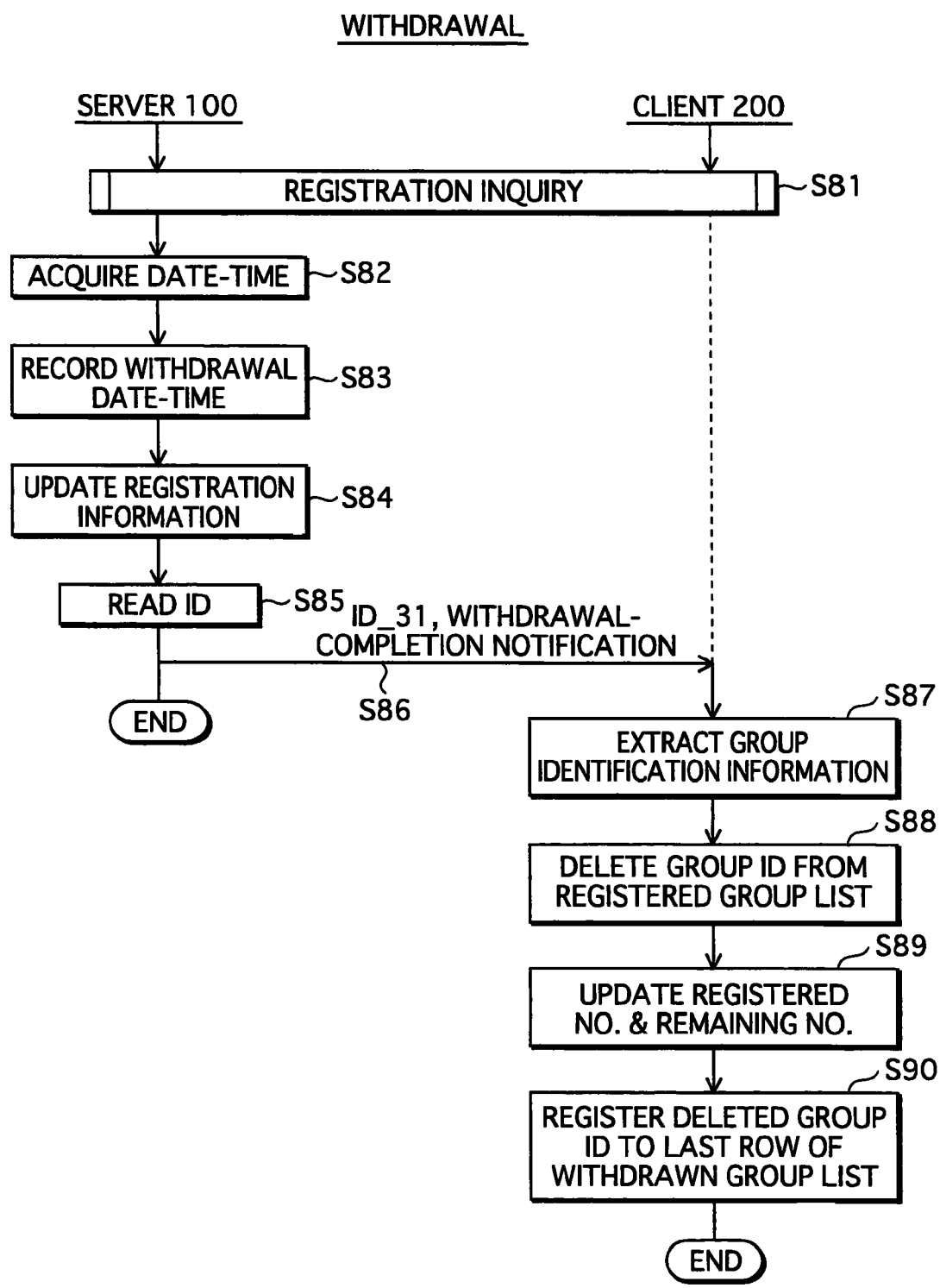
FIG. 15 is a flowchart showing operations for a client to withdraw from a server.

Now, description is given to operation performed at a time the client 200 withdraws from the server 100*a* or 100*b* with reference to FIG. 15.

On the input unit 216 receiving an input requesting withdrawal of the client 200, the control unit 201 controls the registration unit 209 so that a withdrawal request is transmitted to the server 100. In response, the registration inquiry processing described above is performed (step S81).

As a result of the inquiry processing, if it is judged that the client 200 is registered with the server 100, the registration unit 109 of the server 100 acquires a data-time from the timer unit 119 (step S82), and writes the acquired date-time as a withdrawal date-time in the same row as "ID_02" (step S83). The registration unit 109 then updates the registration information by subtracting "1" from the registered number and adding "1" to the remaining number (step S84). Further, the registration unit 109 reads "ID_31" from the ID storage unit 103 (step S85), and transmits to the client 200, a notification that informs completion of the withdrawal and that includes "ID_31" (step S86), and the processing is terminated.

On receiving the withdrawal completion notification that includes "ID_31", the registration unit 209 of the client 200 extracts group identification information from "ID_31" (step S87), and deletes a group ID that matches the extracted group identification information from the registered group list (step S88). The registration unit 209 then updates the registered group list by subtracting "1" from the registered number and adding "1" to the remaining number (step S89). The registration unit 209 then registers the extracted group identification information as a group ID in the last row of the withdrawn group list (step S90), and the processing is terminated.

Note that similar processing is performed when the client 200 withdraws from the server 100*b* or 100*c*.

2.6 Sharing Registered Device List

Figure 16:
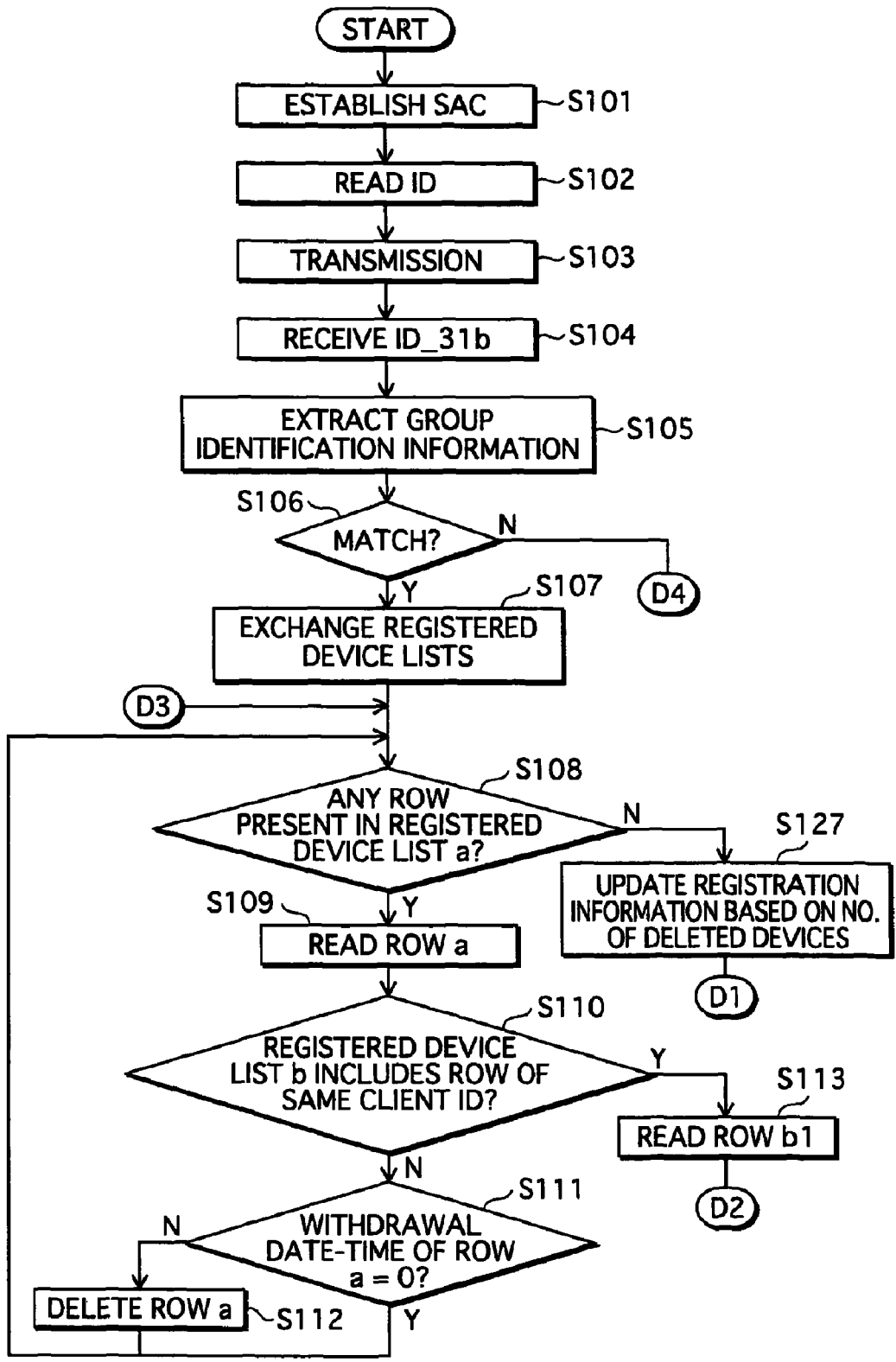
FIG. 16 is a flowchart showing operations for exchanging registered device lists between servers 100a and 100b so as to share an identical registered device list (continued to FIG. 17)
Figure 17:
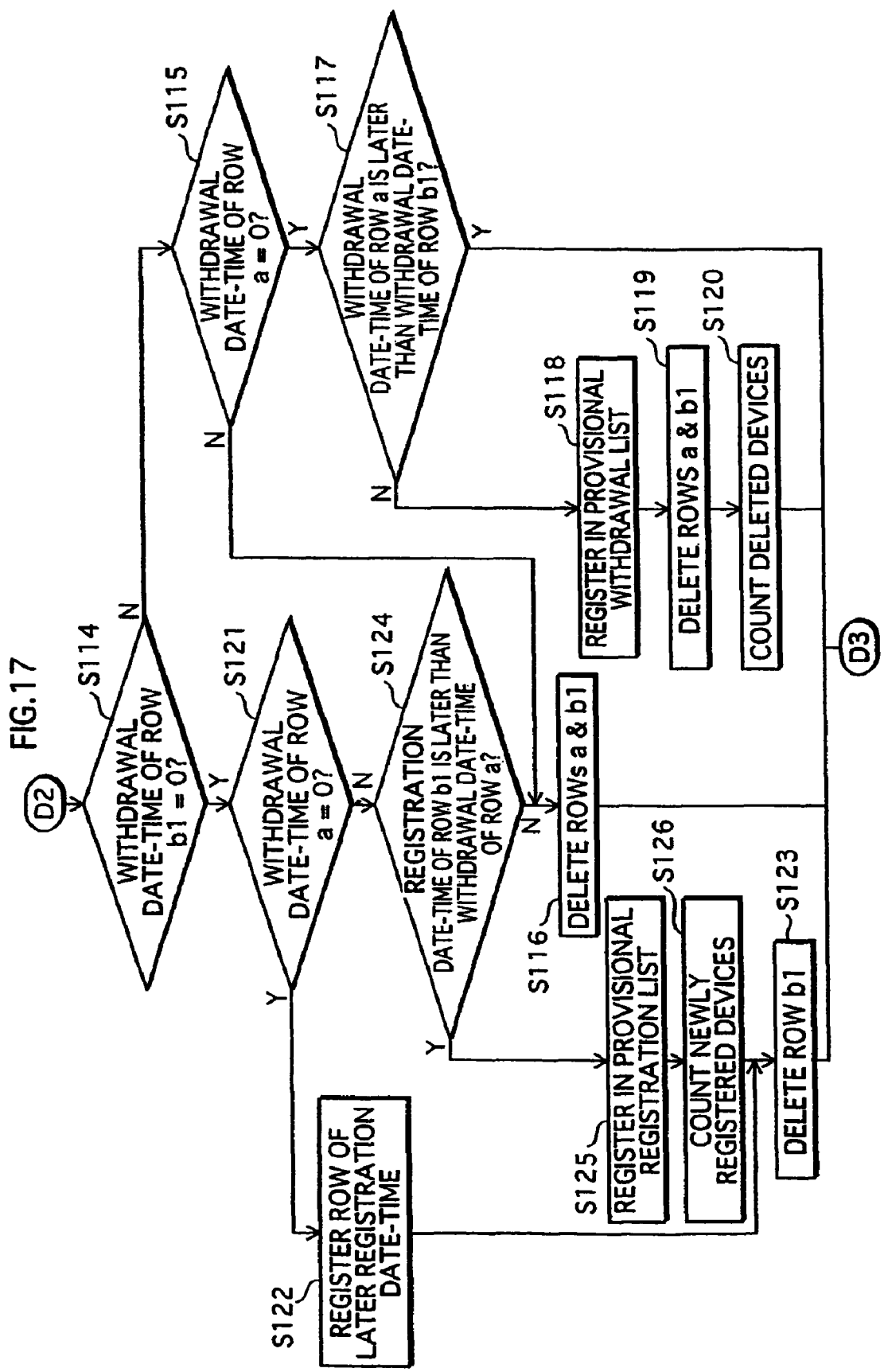
FIG. 17 is a flowchart showing the operations for exchanging registered device lists between servers 100a and 100b so as to share an identical registered device list (continued from FIG. 16 and to FIG. 18)
Figure 18:
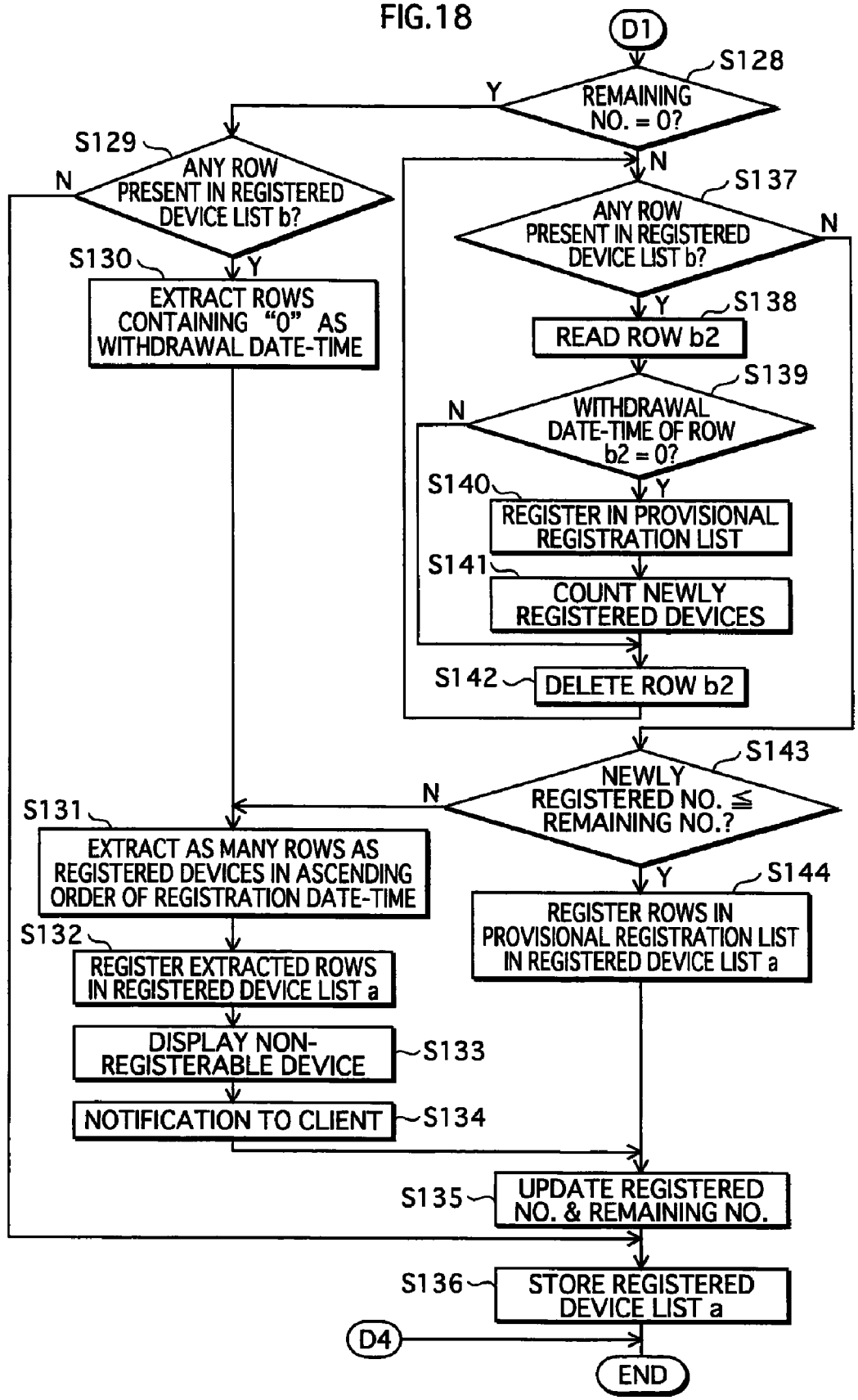
FIG. 18 is a flowchart showing the operations for exchanging registered device lists between servers 100a and 100b so as to share an identical registered device list (continued from FIG. 17)

Now, description is given with reference to FIGS. 16-18 to operations performed for the server 100*a* exchanging registered device lists with the server 100*b* to update the registered device list a.

The server 100*a* controls the public key cipher processing unit 106*a* so as to establish an SAC with the server 100*b* (step S101). When the SAC establishment fails, the processing is terminated.

Once an SAC is established, communication between the servers 100*a* and 100*b* are performed in the following manner. The encryption unit 112*a* or 112*b* encrypts data using the session key SK, and transmits the encrypted data to the other server. When the server at the receiving end receives the encrypted data, the decryption unit 113*a* or 113*b* decrypts the received encrypted data using the session key SK.

The communication unit 118*a* reads "ID_31*a*" from the ID storage unit 103*a* (step S102), and transmits "ID_31*a*" to the server 100*b* (step S103). Further, on receiving "ID_31*b*" from the communication unit 118*b* (step S104), the communication unit 118*a* extracts group identification information from each ID, namely "ID_31*a*" and "ID_31*b*" (step S105) and judges whether the two pieces of extracted information match (step S106). If not matched (step S106, N), the processing is terminated without exchanging the registered device lists. If matched (step S106, Y), it is judged that the server 100*b* belongs to the same group as the server 100*a*. Consequently, the communication unit 118*a* reads and transmits the registered device list a, and receives the registered device list b in return (step S107).

On receiving the registered device list b, the communication unit 118*a* judges whether the registered device list a includes any row registered (step S108). If the registered device list a includes no row (step S108, N), a step S127 and subsequent steps are performed.

If the registered device list a includes one or more rows registered (step S108, Y), the communication unit 118*a* reads a first row in the list (step S109). The row read in the step S109 is referred to as a "row a". Next, the communication unit 118*a* judges whether the registered device list b includes a row with a same client ID as a client ID in the row a (step S110). If such a row is not present in the registered device list b (step S110, N), the communication unit 118*a* further judges whether the withdrawal date-time in the row a is "0" (step S11). If "0" (step S111, Y), the processing goes back to the step S108 to judge whether there is a next row present in the registered device list a.

If the withdrawal date-time is not "0" (step S111, N), the communication unit 118*a* deletes the row a from the registered device list a (step S112), and then goes back to step S108 to judge whether there is a next row present in the registered device list a.

If the registered device list b includes a row with the same client ID (step S110, Y), the communication unit 118*a* reads the row having the same client ID from the registered device list b (step S113). The row read herein is referred to as a "row b1".

Next, the communication unit 118*a* judges whether the withdrawal date-time in the row b1 is "0" (step S114). If not "0" (step S114, N), the communication unit 118*a* further judges whether the withdrawal date-time in the row a is "0" (step S115). If not "0" (step S115, N), the communication unit 118*a* deletes the rows a and b1 from the respective lists (step S116), and goes back to the step S108. If the withdrawal date-time in the row a is "0" (step S115, Y), the communication unit 118*a* further judges whether the registration date-time in the row a is later than the withdrawal date-time in the row b1 (step S117). If the registration date-time in the row a is later (step S117, Y), the processing goes back to the step S108.

If the withdrawal date-time in the row b1 is later (step S117, N), the communication unit 118a registers the row a in a provisional withdrawal list (step S118), and deletes the rows a and b1 from the respective lists (step S119). Further, the communication unit 118a counts the number of deleted rows, i.e., the number of withdrawn devices (step S120), and then the processing goes back to the step S108.

If the withdrawal date-time in the row b1 is "0" (step S114, Y), the communication unit 118a further judges whether the withdrawal date-time in the row a is "0" (step S121). If the withdrawal date-time in the row a is "0" (step S121, Y), the communication unit 118a registers in the registered device list a, either row a or b1, whichever is later in the registration date-time (step S122). The communication unit 118a then deletes the row b1 (step S123), and the processing goes back to the step S108.

When the withdrawal date-time of the row a is not "0" (step S121, N), the communication server 118a further judges whether the registration date-time in row b1 is later than the withdrawal date-time in the row a (step S124). If the registration date-time in the row b1 is not later than the withdrawal date-time in the row a (step S124, N), the communication unit 118a deletes the rows a and b1 from the respective lists (step S116), and the processing goes back to the step S108. If the registration date-time in the row b1 is later than the withdrawal date-time in the row a (step S124, Y), the communication unit 118a registers the row b1 in the provisional registration list (step S125). Further, the communication unit 118a counts the number of newly registered rows, i.e., the number of newly registered devices (step S126), deletes the row b1 (step S123), and then the processing goes back to the step S108.

On completion of the steps S108-S126 on each row registered in the registered device list a (step S108, N), the communication unit 118a updates the registration information by subtracting the number of withdrawn devices from the registered number and adding the thus subtracted number to the remaining number (step S127).

Next, the communication unit 118a judges whether the remaining number is "0" (step S128). If "0" (step S128, Y), the communication unit 118a judges whether one or more next rows are present in the registered device list b (step S129). If such a row is present, the communication unit 118a extracts all the rows with a withdrawal date-time being "0" (step S130). Next, the communication unit 118a selects, from the rows registered in the registered device list and the thus extracted rows, as many rows as the maximum number in the ascending order of the registrations dates-times (step S131), and registers the thus selected rows in the registered device list a (step S132). Regarding the rows not registered in the registered device list a, the communication unit 118a displays on the display unit 116a the fact that registration of clients corresponding to the non-registered rows is not possible (step S133), and transmits a withdrawal notification to each client that is not registerable or that is listed in the provisional withdrawal list (step S134). The withdrawal notification includes "ID_31a" and informs that the client receiving the notification has withdrawn from the server 100a. Thereafter, the communication unit 118a updates the registration information by altering the registered number to the value held as the maximum number and altering the remaining number to "0" (step S135). Further, the registered device list a is stored back to the registered device list storage unit 107a (step S136), and the processing is terminated.

If the remaining number is not "0" (step S128, N), the communication unit 118a judges whether the registered device list b includes one or more rows (step S137). If the registered device list b includes one or more rows (step S137, Y), the communication unit 118a reads a first row in the list (step S138). The row read in the step S138 is referred to as a "row b2". Next, the communication unit 118a judges whether the withdrawal date-time in the row b2 is "0" (step S139). If not "0" (step S139, N), the row b2 is deleted (step S142), and the processing goes back to the step S137 to judge whether a next row is present in the registered device list b.

If the withdrawal date-time in the row b2 is "0" (step S139, Y), the communication unit 118a registers the row b2 in the provisional registration list (step S140), and counts the registered row as the number of newly registered devices (step S141). The communication unit 118a then deletes the row b2 from the registered device list b (step S142), and goes back to the step S137 to judge whether a next row is present in the registered device list b.

When there is no more row present in the registered device list b (step S137, N), the communication unit 118a judges whether the number of newly registered devices is less than or equal to the remaining number (step S143). If the newly registered number is not greater than the remaining number (step S143, Y), the communication unit 118a registers all the rows in the provisional registration list in the registered device list a (step S144). The communication unit 118a then updates the registration information by subtracting the newly registered number from the remaining number and adding the newly registered number to the registered number (step S135). The registered device list a is then stored back to the registered device list storage unit 107a (step S136), and the processing is terminated.

If the newly registered number is greater than the remaining number (step S143, N), the communication unit 118a selects, from all the rows registered in the registered device list a and the provisional registration list, as many rows as the remaining number in the ascending order of the registration dates-times (step S131), and registers the thus selected rows in the registered device list a (step S132). Regarding the rows not registered in the registered device list a, the communication unit 118a displays on the display unit 116a the fact that registration of clients corresponding to the non-registered rows is not possible (step S133), and transmits a withdrawal notification to each client that is not registered or that is listed in the provisional withdrawal list (step S134). Thereafter, the communication unit 118a updates the registration information by altering the registered number to the value held as the maximum number and altering the remaining number to "0" (step S135). Further, the registered device list a is stored back to the registered device list storage unit 107a (step S136), and the processing is terminated.

Through the above processing, the servers 100a and 100b share the same list.

Note that the server 100c and 100d perform similar processing.

3. RECAPITULATION

As described above, the present invention provides a group admission system that is composed of at least one client and at least one server, and is for the client to join a group to be a member device thereof by registering with the server that belongs to the group.

The client requests to join the group by transmitting a registration request to the server together with information unique to the client if the number of groups that the client is in is less than the maximum number of groups that the client is permitted to be in.

The server that belongs to the group receives the registration request. If the number of devices registered with the server is less than the maximum number of devices registerable with the server, the server registers the received unique information and transmits identification information identifying the group to the client.

The client receives the identification information from the server, and stores the received identification information.

Note that in the initial state where the client belongs to no group, the client stores no identification information. Similarly, in the initial state where no client is registered, the server stores no unique information.

4. MODIFICATIONS

Up to this point, the present invention has been described by way of the specific embodiment. It is naturally appreciated, however, the present invention is not limited to the specific embodiment described above, and various modifications including the following still fall within the scope of the present invention.

(1) Although in the above embodiment, each group includes two servers, the number of the servers in a group may be three or more, or even one.

Further, each server may be provided with a playback function, so that a content is played back by the servers.

(2) On receiving a server ID, the client 200 may refer to the registered group list to judge whether the client is already registered in the group to which the server identified by the received ID belongs.

(3) According to the above embodiment, the registered device list stores a withdrawal date-time for each registered device. Instead of a withdrawal date-time, it is applicable to store a flag indicating whether a corresponding device has withdrawn.

In this case, a server exchanges registered device lists with another server, and then checks the list stored therein against the list received from the other server to see if the list includes any row with a client ID that is also included in the other list. If either of the flags in rows having the same client ID indicates that a corresponding device has withdrawn, the server deletes the row from the list stored therein and then updates the registration information.

(4) According to the above embodiment, a plurality of servers share the same registered device lists and thus manages the same set of clients. However, each of a plurality of servers in the same group may manage a different set of clients.

Figure 19:
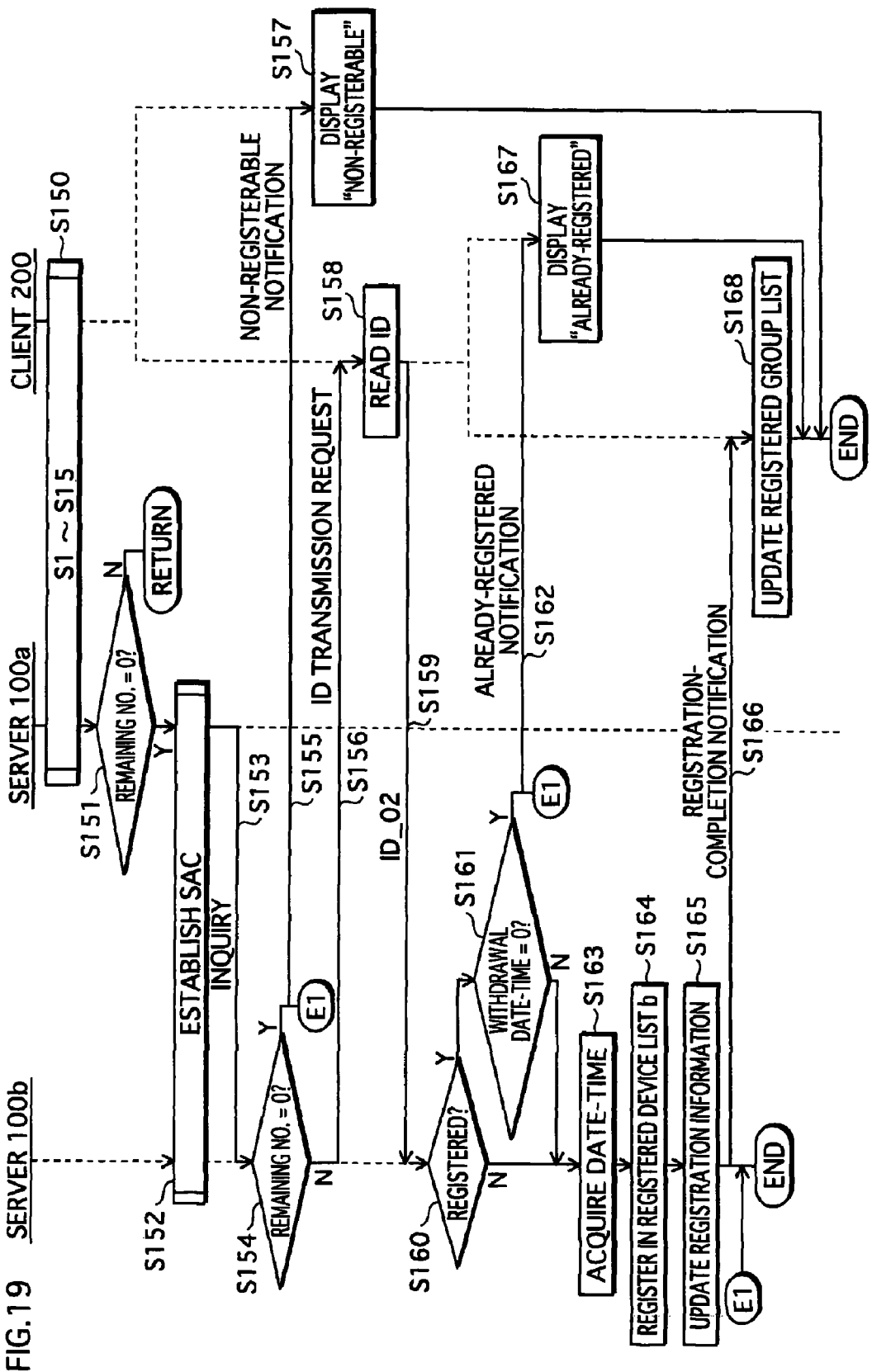
FIG. 19 a flowchart showing operations for the server 100a to inquire the server 100b as to whether a client is registerable.

(A) Hereinafter, with reference to FIG. 19, description is given to one example in which the client 200 transmits a registration request to the server 100a, and the server 100a inquires the server 100b as to whether the client 200 is registerable with the server 100b.

The steps S1 through S15 as described above are performed (step S150). Similarly to the step S17, the server 100a judges whether the remaining number is "0" (step S151). If not "0" (step S151, N), the steps S18 and thereafter are performed, so that the client 200 is registered with the server 100a.

If the remaining number is "0" (step S151, Y), an SAC is established between the server 100a and the server 100b, so that the session key SK is shared (step S152). Once the session key SK is shared, every data transmission thereafter is performed by encrypting data at a transmitting end and decrypting the data at a receiving end both using the session key SK.

The server 100a inquires the server 100b as to whether the client is registerable with the server 100b (step S153).

Similarly, the server 100b judges whether the remaining number held in the registration information b is "0" (step S154). If "0" (step S154, Y), the server 100b transmits a notification to the client 200 via the server 100a that registration is not possible (step S155), and then the processing is terminated. If the remaining number is not "0" (step S154, N), the server 100b transmits an ID transmission request to the client 200 via the server 100a (step S156).

When receiving the notification that registration is not possible, the client 200 displays on the monitor 219 the fact that registration is not possible (step S157), and terminates the processing. When receiving the ID transmission request, on the other hand, the client 200 reads "ID_02" from the ID storage unit 203 (step S158) and transmits "ID_02" to the server 100b via the server 100a (step S159).

On receiving "ID_02", the server 100b judges whether "ID_02" is registered in the registered device list b (step S160). If registered (step S160, Y), the server 100b further judges whether the withdrawal date-time is "0" (step S161). If "0" (step S161, Y), the server 100b transmits a notification that the client is already registered to the client 200 via the server 100a (step S162) and terminates the processing. If "ID_02" is not registered (step S160, N) or the withdrawal date-time is not "0" (step S161, N), the server 100b acquires a date-time from the timer unit 119 (step S163), and stores "ID_02" with the acquired date-time in the registered device list b (step S164). Further, the server 100b updates the registered number and the remaining number held in the registration information b (step S165), and transmits a notification to the client 200 via the server 100a that registration is completed (step S166).

On receiving the notification that the client is already registered, the client 200 displays the received notification on the monitor 219 (step S167), and terminates the processing. On receiving the notification that the registration is completed, the client 200 additionally registers in the registered group list, group identification information included in the received server ID (step S168), and terminates the processing.

Note that an inquiry as to whether a client is registerable may be made not only when the remaining number is "0" but also when the server is executing another processing.

Further, when the remaining numbers held in both the servers 100a and 100b are "0", such an inquiry may be made to yet another server 100 provided that three or more servers belong to the same group.

(B) Next, description is given with reference to FIG. 20 to processing to inquire about whether a client is already registered.

The steps S41 through S52 as described above are performed (step S170). Next, similarly to the step S54, the server 100a judges whether the withdrawal date-time is "0" (step S171). If "0", it is judged that the client 200 is registered with the server 100a, so that content transmission processing or the withdrawal processing may be subsequently performed.

If not "0" (step S171, N), an SAC is established between the servers 100a and 100b, so that the session key SK is shared (step S172). Note that once the SAC is established, every communication thereafter is performed in encrypted form using the session key SK.

Next, the server 100a inquires the server 100b using "ID_02" as to whether the client 200 is registered (step S173).

In response, the server 100*b* judges whether "ID_02" is registered in the registered device list b (step S174). If registered (step S174, Y), the server 100*b* further judges whether the withdrawal date-time is "0" (step S175). If "0" (step S175, Y), subsequent processing is carried out. If not registered in the registered device list b (step S174, N) or if the withdrawal date-time is not "0" (step S175, N), the server 100*b* transmits a notification to the client 200 via the server 100*a* that the client is not registered (step S176).

On receiving the notification that the client is not registered, the client 200 displays on the monitor 219 the fact that the client is not registered, and terminates the processing.

(5) According to the above embodiment, the servers 100*a* and 100*b* exchange registered device lists to share the same list, so that the two servers act just as a single server. However, one of a plurality of servers may act as a main server to control the clients.

In this case, one of the plurality of servers is determined as the main server by a user or by the servers according to a predetermined condition as follows. For example, each server may be assigned a priority rank in advance, and a server having a highest rank is determined as the main server. In another example, a server having the smallest processing task or the highest processing capability is determined as the main server.

Servers other than the main server make an inquiry to the main server when receiving a registration request from a client.

In response to the inquiry, the main server operates similarly to the above embodiment so as to judge whether the client is registerable. If registerable, the main server registers the client in the registered device list, and updates the registered number and the remaining number held in the registration information accordingly. Further, the main server transmits a notification that the registration is completed to the client via the server to which the registration request is made.

(6) Rather than one password, a plurality of passwords may be provided within a predetermined number. This makes it possible that each of a plurality of users sets a different password. For example, each of family members may set a different password.

Further, rather than the password authentication, biometric authentication may be applied using a fingerprint, an iris image, or the like.

For example, when a fingerprint is inputted, the server 100 extracts features from the fingerprint and stores the extracted features to use them just as a password.

When making a registration request, a user inputs a fingerprint to the client 200. In response, the client 200 extracts features from the received fingerprint, and transmits the features functioning as a password to the server 100.

On receiving the features, the server 100 compares the received features with the previously stored features to see how well they match. When the two sets of features match by a predetermined percentage or higher, the server 100 determines the two fingerprints match, and subsequent processing is continually performed.

Similarly, in the case of an iris image, features of a user's iris image are extracted, and the extracted features are compared with previously stored features. If the two sets of the features match by a predetermined percentage or higher, it is judged that two iris images match.

As described above, through the use of a password, a fingerprint or an iris image, it is made extremely difficult for a third party to register an unauthorized client with the server.

Instead of IDs mentioned in the above embodiment, MAC addresses or IP addresses may be used.

In the case of using MAC addresses or IP addresses (hereinafter, referred to simply as "addresses"), each device retains correspondence information showing addresses each associated with a piece of identification information identifying a group to which a server identified by the address belongs. When, for example, a device A needs to judge whether a device B belongs to the same group, the device A acquires an address of the device B, and refers to the correspondence information to retrieve identification information associated with the acquired address. Consequently, the device A finds out whether the device B belongs to the same group.

Further, when a server and a client conduct radio communication, the server may authenticate the client if it is located within range of the radio waves, and vice versa.

Further, when communication is possible between a server and a client, the server may transmit authentication data to the client, and the client transmits response data to the server. The server measures the time period taken between transmission of the authentication data and reception of the response data. If the measured time period is within a predetermined threshold, the client may be authenticated as being located in the same home.

Also, TTL (Time To Live) values may be set to be within the number of in-home routers, and thus the server is disabled from communicating with devices outside the home.

Also, a server may authenticate a client as located in the same home by judging whether the client is connected to the same power source as the server.

(7) A client may be provisionally registered with a server in advance, and then actually registered with a server when a user desires to use the client via a network.

An example of such processing is given below. Prior to registration of the client 200 with the server 100, the user manually inputs the client ID "ID_02" to the server 100. The server 100 stores the inputted client ID "ID_02" as a provisionally registered device. At this stage, the server 100 does not update the registered number and the remaining number.

When the user takes the client 200 out of the home, and desires to view a content stored in the server 100 via the Internet 500, the client 200 performs the steps S1 through S21 described in the above embodiment.

As a result, the server 100 receives the client ID "ID_02", and judges whether the received client ID is provisionally registered. If provisionally registered, the server 100 performs the steps S26 through S29, so that the client 200 is formally registered in the registered device list. The server 100 then updates the registration information accordingly. If not provisionally registered, the server 100 then performs the steps 23 and 24 to judge whether the client ID is in the registered device list. If the client ID is in the list, the server 100 transmits to the client 200, a notification that the client is already registered. If the client ID is not provisionally registered, the server 100 does not register the client 200 in the registered device list and transmits to the client 200, a notification that provisional registration is not yet conducted. In the case of receiving the notification of registration completion, the client 200 updates the registered group list similarly to the step 31, and goes on the processing to view a content. In the case of receiving the notification that provisional registration is not yet conducted, the client displays the received notification on the monitor 219 and terminates the processing.

With the above processing, a portable device such as a notebook PC is provisionally registered in advance for further use at a remote location, and the device is counted as a registered device only when the device is actually registered.

(8) The client 200 may be constructed so as not to be allowed to register with a server from which the client once withdrew.

To this end, the server 100 stores a withdrawn device list, and registers an ID of every client that once registered with the server 100 but withdrew.

On receiving a registration request that includes an ID from a client, the server judges whether the received ID is in the withdrawn device list. If the ID is in the list, the server transmits to the client, a notification that registration is not possible. If the ID is not in the list, the server conducts the registration processing.

(9) The servers 100a and 100b may exchange a registered device list a and the registered device list b to manage the number of servers each client is registered with.

(10) The client 200 may select which of a plurality of servers to register with.

The selection may be made by the user or by the client 200 according to a predetermined condition. For example, the client 200 may select a server at the closest location, a server with the fastest transmission rate, a server having the highest processing capability, or a server having the smallest amount of other tasks.

(11) The client 200 may be registered with a server only for a limited time period.

When registering the client 200, the server 100 may generate expiration information showing a time period during which the registration with the server 100 remains valid, and informs the client 200 of the expiration information.

The server 100 and the client 200 monitor passage of time, and at the expiration shown by the expiration information, the server 100 deletes the ID of the client 200 from the registered device list, and updates the registration information by subtracting "1" from the registered number and adding "1" to the remaining number. In addition, the client 200 updates the registered group list by deleting the server ID, subtracting "1" from the registered number and by adding "1" to the remaining number. Further, the client 200 registers in the withdrawn group list, the ID for the group to which the server 100 belongs.

As described above, the client is registered only for a time period shown by the expiration information, and the registration is automatically canceled at the expiration of the time period.

As mentioned above, according to the present invention, a portable device may be registered as a client although such a portable device may be used outside the user's home. Since registration of such a portable device is also cancelled automatically at the expiration of a predetermined time period, the risk of unauthorized use of contents by a third party is reduced.

Note that transmission of expiration information to the server may be omitted. In this case, the server monitors passage of time and transmits, at the expiration of the time period, a notification of the expiration to the client 200. On receiving the notification, the client performs the processing similar to the above.

The expiration information may show a date-time of the start/end of the time period, or only the end date-time. Also, the expiration information may show a start date-time and the duration of the time period.

(12) A plurality of groups of clients each managed by a server may be merged into a single group.

Hereinafter, description is given in detail by way of an example. In this example, a server 100p (not illustrated) originally belongs to a group p, and a server 100q (not illustrated) originally belongs to a group q, and the groups p and q are now merged into a group r.

To this end, the servers 100p and 100q exchange the registered device lists p and q in the similar manner to the above embodiment, so that a registered device list r is shared.

Here, the maximum number of devices registrable with the group r is one of, or the average of the maximum numbers of the groups p and q. In the case where the total number of devices registered in the groups p and q is greater than the maximum number of the group r, member devices of the group r are selected, similar to the above embodiment, in the ascending order of the registration dates-times or arbitrarily by the user.

Here, either of the servers 100p and 100q may be designated as a main server managing the clients in the group r, and the other server may join the group r as a client. Also, one of the servers may manage the clients belonging to the group r and the other server makes an inquiry as necessary similar to the above (5).

Further, in the case where the groups p and q each include a plurality of servers, all the servers may share a registered device list to manage the clients of the group r, or one or more of the servers may be selected to manage the clients. Here, the selection of the servers may be made arbitrarily by the user or by the servers according to the predetermined condition. In the latter case, the selection may be made according to the priority ranks assigned in advance to the servers, or the processing capacities of the servers, or the amount of other tasks the servers currently have.

(13) One group may be divided into a plurality of groups.

Now, description is given in detail by way of an example in which a group s is divided into groups t and u.

A server 100s (not illustrated) belonging to the group s selects one of a plurality of clients that also belong to the group s. The selected client is now designated as a server 100u that belongs to the group u. The server 100s then designates itself as a server 100t that belongs to the group t.

Here, the server 100s may select the servers 100t and 100u according to the priory ranks assigned to the servers. Alternatively, the server 100s may select, as the server 100u, a device having the highest performance capability or the smallest amount of other tasks. Further, the servers 100t and 100u may be selected from the clients in the similar manner or arbitrarily by the user.

Next, the thus designated servers 100t and 100u select clients to be members of their groups, and newly generate registered device lists t and u. The selection of clients may be made arbitrarily by the user. Alternatively, the selection may be made by separating clients alternately in the order of registration dates-times or priority ranks or by separating the clients into the first half and the second half in the order registered in the registered device list s, in the order of the previously assigned priority ranks, or in the order of the registration dates-times.

Further, in the case where a plurality of servers belong to the group s, the servers 100t and 100u may be selected from the servers, and then the clients may be selected in the above manner.

(14) In the above embodiment, the maximum number of clients registerable with the server 100 shown in the registration information is determined in advance. Similarly, the maximum number of groups that the client 200 may join shown in the registered group list is determined in advance. However, those numbers may be determined at a later stage.

To this end, the server 100 or the client 200 requests a desired maximum number to an external management device provided by a management authority. In response, the management device conducts billing processing for the charge according to the requested number. On confirming that the billing processing is duly performed, the management device grants the requested number to the device that made the request, so that the device is allowed to set the granted number as the maximum number.

Further, a request for an additional number may be made to the management device even after the maximum number is once set. On the management device conducting the billing processing and thus granting the requested number, the device that made the request alters the maximum number by adding the newly granted number to the current maximum number.

(15) When the server 100 transmits a content to the client 200, an encrypted content may be transmitted without requiring authentication to be performed, but a content key is transmitted only after authentication.

Further, the server 100 may transmit a content to the client 200 without a content transmission request from the client 200. For example, the server 100 may receive an external input, and transmit a content to the client in response to the external input. Also, the server 100 may transmit contents to the client 200 each time a content is acquired provided that authentication is successfully performed.

(16) The present invention may be embodied as methods shown above. Further, each of the methods may be a computer program run by a computer or a digital signal representing the computer program.

Further, the present invention may be embodied as a computer-readable recording medium storing the computer program or the digital signal. Examples of such a recording medium include a flexible disk, a hard disk, a CD-ROM, an MO, a DVD, a DVD-ROM, a DVD-RAM, a BD (Blu-ray Disc) and a semiconductor memory. Further, the present invention may be embodied as the computer program or the digital signal recorded on any recording medium mentioned above.

Further, the present invention may be embodied as the above computer program or digital signal that is transmitted via a network, such as an electronic communications network, a wired or wireless communications network, or the Internet.

Further, the present invention may be embodied as a computer system composed of a microprocessor and memory. The memory stores the computer program mentioned above. The microprocessor may operate according to the computer program.

Further, the program or the digital signal may be transferred in form of a recording medium mentioned above, or via a network mentioned above, so that the program or the digital signal may be executed by another independent computer system.

(17) Further, the present invention may be any combination of the above-described embodiment and modifications.

5. CONCLUSION

As described above, the present invention provides a group admission system in which a server and a client determine whether the client is permitted to join a closed group to be a member device thereof. The group is a range within which contents are available. The group admission system is composed of: a first restricting unit included in the client and operable to determine whether it is permissible for the client to request to join the group based on a number of groups that the client is in and a maximum number of groups that the client is permitted to be in; and a second restricting unit included in the server that supplies a content to member devices of the group and operable, when the client requests to join the group, to determine whether to permit the client to join the group by registering with the server based on a number of member devices registered with the server and a maximum number of member devices registerable with the server.

Here, when determined permissible by the first restricting unit, the client may request to join the group by transmitting a registration request to the server together with information unique to the client. When permitted by the second restricting unit, the server may receive the registration request and the unique information, register the received unique information, and transmit group identification information to the client. The client may receive and store the group identification information.

In another aspect, the present invention provides a server for registering a client that requests to join a group to which the server belongs. The group is a range within which contents are available. The server includes: a receiving unit operable to receive from the client, information unique to the client and a request for registration with the server; a judging unit operable, when the client is an authorized device, to judge whether a number of member devices registered with the server is less than a maximum number of member devices registerable with the server; a registering unit operable, when judged that the registered number is less, to register the received unique information; and a communicating unit operable, on registration of the unique information, to transmit identification information identifying the group to the client.

In yet another aspect, the present invention provides a client for joining a group by registering with a server that belongs to the group. The group is a range within which contents are available. The client includes: a judging unit operable, when the server is an authorized device, to judge whether a number of groups that the client is registered to be in is less than a maximum number of groups that the client is permitted to be in; a communicating unit operable, when judged that the registered number is less, to transmit to the server, a request for registration with the server together with information unique to the client, and receive from the server, identification information identifying the group to which the server belongs; and a registering unit operable to register the received identification information.

With the structures stated above, the number of clients registrable with one server is limited, and thus the number of clients that may join in one group is limited.

Further, each client is also limited in the number of groups which the client may join, so that it is prevented that the client joins an unlimited number of groups. Consequently, usage of contents is permitted only to a limited number of devices which are legitimately registered.

Further, since an external server is not required, the cost for setting and operating such an external server is eliminated.

Here, of the server the judging unit of the server may judge whether the unique information is already registered by the registering unit. The registering unit of the server may prohibit registration of the unique information when judged that the unique information is already registered.

With the structure stated above, whether the client is already registered is checked, so that no client is registered in duplicate.

Here, the registration request may include a first authentication value. The judging unit of the server may prestore a second authentication value, and authenticate the client when the first and second authentication values match.

Further, the first and the second authentication values may be passwords.

Further, the registration request may include a first data set on a feature that is extracted from a user's fingerprint. The judging unit of the server may prestore a second data set on a feature that is extracted from a user's fingerprint, and judge whether the first and second data sets match.

Further, the registration request may include a first data set on a feature that is extracted from a user's iris image. The judging unit of the server may prestore a second data set on a feature that is extracted from a user's iris image, and judge whether the first and second data sets match.

Further, the client may further include an input receiving unit operable to receive an authentication value from an external source. The communicating unit of the client may transmit the registration request that includes the authentication value.

Further, the input receiving unit may receive a password as the authentication value.

Further, the input receiving unit may receive a user's fingerprint as the authentication value, and extract a feature from the fingerprint. The communicating unit of the client may transmit the registration request that includes the feature.

Further, the input receiving unit may receive a user's iris image as the authentication value, and extract a feature from the iris image. The communicating unit may transmit the registration request that includes the feature.

With the structures stated above, the client transmits to the server, an authentication value such as a password that is known exclusively to a legitimate user. Using the authentication value, the server is enabled to authenticate legitimacy of the client to be registered. The authentication value may be a fingerprint or an iris image of the user, so that it is prevented that a malicious third party uses the authentication value.

Here, the judging unit of the server may authenticate the client when the client is connected to a local area network to which the server is connected.

With the structure stated above, the server registers the client only if the client is connected to the same local area network as the server. Consequently, a risk is reduced that a malicious third party is registered with the server.

Here, when another server that belongs to the group is designated as a main server of the group, the communicating unit of the server may transfer, on the receiving unit receiving the registration request and the unique information, the received registration request and unique information to the main server. The main server may register the unique information when judging that a number of member devices registered with the main server is less than a maximum number of member devices registerable with the main server, and output representative identification information as a judgment result to the server. The representative identification information identifies a group to which the main server belongs. The judging unit of the server may receive the judgment result instead of judging whether the registered number is less than the maximum number. The communicating unit of the server may transmit the received judgment result to the client.

Further, the communicating unit of the server may include a designating subunit operable to designate one of the server and the other server as the main server.

Further, the designating subunit may designate the main server based on at least one of predetermined conditions that are priority ranks, performance capabilities, and processing status of the servers.

With the structure stated above, the main server collectively manages registration of clients and the number of registered clients in the group. Consequently, the number of clients registered in the group is limited. Further, since the main server is designated according to the priority ranks, the performance capabilities, or amounts of tasks of the candidate servers, a server capable of efficient processing is designated to be the main server.

Here, the communicating unit of the server may further transmit inquiry information to another server that belongs to the group. The inquiry information includes the received unique information and inquires as to whether the client is registrable with the other server. The other server may judge whether a number of member devices registered with the other server is less than a maximum number of member devices registrable with the other server, and when judged that the registered number is less, register the unique information and transmits identification information as a judgment result to the server. The identification information identifies a group to which the other server belongs. The judging unit of the server may receive the judgment result from the other server instead of judging whether the registered number is less than the maximum number. The communicating unit may transmit the received judgment result to the client.

Further, the communicating unit of the server may transmit the inquiry information to the other server when the judging unit judges that the registered number is equal to the maximum number.

Further, the communicating unit of the server may acquire from the other server, first identification information identifying the group to which the other server belongs. The judging unit of the server may prestore second identification information identifying the group to which the server belongs, and judge whether the acquired first identification information matches the second identification information. The communicating unit of the server may transmit the inquiry information when the first identification information matches the second identification information.

With the structures stated above, more than one server each manages the number of clients registered with a corresponding server. Consequently, even if one server is temporarily incapable of registration processing because it is busy with other tasks or the power is off, another server may instead perform the registration processing. Further, since the servers mutually authenticate each other to see if they belong to the same group, it is avoided that the client is registered in a group different from a desired group.

Here, the communicating unit of the server may acquire from a management device that is external to the group, a number of member devices registrable with the server, and make a payment according to the acquired number. The judging unit of the server may set the acquired number as the maximum number.

Further, the communicating unit of the client may acquire from a management device that is external to the group, a number of groups that the client is permitted to be in, and make a payment according to the acquired number. The judging unit of the client may set the acquired number as the maximum number.

With the structures stated above, it is advantageous for copyright holders since the management device charges the server or the client for the requested number. Further, it is advantageous also for the users since the maximum number of registrable groups or devices is flexibly set on payment of appropriate fees.

Here, the communicating unit of the server may acquire from a management device that is external to the group, a number of devices additionally registrable with the server, and make a payment according to the acquired number. The judging unit of the server may add the acquired number to the maximum number to obtain a new maximum number.

Further, the communicating unit of the client may acquire from a management device that is external to the group, a number of groups that the client is additionally permitted to be in, and make a payment according to the acquired number. The judging unit of the client may add the acquired number to the maximum number to obtain a new maximum number.

With the structures stated above, it is advantageous for copyright holders since the management device charges the server or the client for the requested number. Further, it is advantageous also for the users since the maximum number of registrable groups or devices is flexibly increased on payment of appropriate fees.

Here, the server may further include a content storage unit operable to store a content key and a content that is encrypted using the content key; a key generating unit operable to generate a session key; and an encrypting unit operable to encrypt the content key using the session key to obtain an encrypted content key. The receiving unit may receive a content transmission request and unique information from a client. The judging unit of the server may judge whether unique information identical to the received unique information is registered. The communicating unit of the server may transmit, when judged that identical unique information is registered, the encrypted content and the encrypted content key to the client that issued the content transmission request.

With the structures stated above, the contents transmitted only to clients that are registered in advance. Consequently, use of contents is permitted exclusively to specific devices, and thus unauthorized use by devices not registered is prevented.

Here, the registering unit of the server may generate valid period information showing a valid period during which the registered unique information remains valid, store the valid period information associatively with the unique information, monitor expiration of the valid period, and delete the unique information on expiration of the valid period. The judging unit of the server may increment the registered number on registration of the unique information, and decrement the registered number on deletion of the unique information.

With the structure stated above, each client remains registered only for a limited time period. Consequently, the possibility of unauthorized use of contents decreases. Further, the server increases the number of devices currently registered each time unique information is registered, and decreases each time unique information is deleted, so that the registered number is maintained in consistency with the number of devices actually registered.

Here, the communicating unit of the server may transmit, on registration of the unique information, the valid period information to the client.

Further, the communicating unit of the client may receive, after transmitting the registration request, valid period information showing a valid period during which the client remains registered with the server. The registering unit of the client may monitor expiration of the valid period, and delete the identification information on expiration of the valid period. The judging unit of the client may increment the registered number on registration of the identification information, and decrement the registered number on deletion of the identification information.

With the structures stated above, each device individually monitors valid periods, so that the server and the client respectively delete unique information and identification information as necessary without communicating with each other.

Here, on expiration of the valid period, the communicating unit of the server may transmit to the client, an expiration notification indicating that the valid period has expired.

Further, the communicating unit of the client may further receive, after receiving the identification information, a notification informing that the valid period has expired. The registering unit of the client may delete the identification information on receipt of the notification. The judging unit of the client may increment the registered number on registration of the identification information and decrement the registered number on deletion of the identification information.

With the structures stated above, it is the server that monitors and manages the valid periods. That is to say, the valid period management is carried out without requiring the client to perform any additional processing.

Here, the receiving unit may receive a withdrawal request and unique information from a client. The registering unit of the server may delete unique information that is identical to the unique information received with the withdrawal request. The judging unit of the server may increment the registered number on registration of the unique information, and decrement the registered number on deletion of the unique information.

Further, the communicating unit of the client may transmit to the server, a request for withdrawal of the client from the group, and receive from the server a notification informing that the requested withdrawal is completed. The registering unit of the client may delete the identification information on receipt of the notification. The judging unit of the client may increment the registered number on registration of the identification information and decrement the registered number on deletion of the identification information.

With the structures stated above, the user is allowed to register another client after withdrawing a currently registered client. Further, the server increases the number of devices currently registered each time a client is registered and decreases each time a client withdraws. Consequently, the server maintains the number of devices registered in consistency with the number of devices actually registered. Further, on withdrawal from a server, a client deletes corresponding identification information and decreases the number of groups the client is registered. Accordingly, the client is allowed to register with another server.

Here, the registering unit of the server may register the deleted unique information in a withdrawal list. The judging unit of the server may judge whether the withdrawal list includes unique information identical to the unique information that is received with the registration request. The registering unit of the server may prohibit registration of the unique information when judged that identical unique information is in the withdrawal list.

With the structure stated above, a client is prohibited from registering with a server from which the client once withdrew. Consequently, it is prevented that a client repeatedly registers with and withdraws from a same server to pass a content to another device.

Here, the registering unit of the client may register the deleted identification information in a withdrawal list. The communicating unit of the client may acquire, before transmitting the registration request, the identification information from the server. The judging unit of the client may judge whether the withdrawal list includes identification information that is identical to the acquired identification information anywhere in the withdrawal list or at a last of the withdrawal list in a registration order. The communicating unit of the client may transmit the registration request to the server when judged that no identical identification information is registered in the withdrawal list or when identical information is registered at the last of the withdrawal list.

With the structure stated above, a client is allowed to register back in a group from which the client most recently withdrew. That is to say, although a client is basically prohibited from registering with servers from which the client once withdrew, each client is still allowed to register with a specific server even after once withdrawing from the server. In the case where a user has more clients than the maximum number of clients registrable with a server, the user is allowed to use a content with any of the clients desired by appropriately registering and withdrawing the clients with and from the server, and yet the number of clients registered with the server at a time is duly limited.

Here, the server may further include a selecting unit operable, in conjunction with another server, to select whether each client in the group is to remain in the group or to be withdrawn from the group and join another group to which the other server belongs. The registering unit of the server may delete unique information corresponding to the client selected to be withdrawn from the group and decrement the registered number by a number of pieces of unique information deleted.

With the structure stated above, clients belonging to one group may be divided into two mutually independent groups.

Here, the selecting unit may further select, from the servers belonging to the group, a server to be designated as the other server.

With the structure stated above, in the case where there are more than one server in one group, the servers may be made to belong to different groups.

Here, the selecting unit may further select, from the clients in the group, a client to be designated as the other server.

Further, the selecting unit may select the client to be designated as the other server based on at least one of predetermined conditions that are priority ranks, performance capabilities, and processing statuses of the clients in the group.

Further, the client may further include a selecting unit operable, when the client is designated a server of another group and in conjunction with the server of the group, to select whether each client in the group is to remain in the group or to be withdrawn from the group and join the other group. The communicating unit of the client may transmit identification information identifying the other group to the client selected to join the other group. The registering unit of the client may delete the identification registered, and register unique information of the client selected to join the other group.

Further, the communicating unit of the client may acquire from the server, unique information of the client selected by the selecting unit to join the other group.

With the structures stated above, a server to be made to belong to another group is selected based on the priority ranks, performance capabilities, and processing statuses of the servers. As a result, a device capable of efficient processing is selected as the server of the other group. Further, if a client is selected to be a server of the other group, the thus selected client acquires from the server of the original group, unique information of member devices of the other group. Consequently, the thus selected client registers the member devices and acts as the server of the other group.

Here, the receiving unit may further receive a priority rank of each client. The selecting unit may make the selection based on the priority ranks.

Further, the registering unit of the server may include: a timer subunit operable to clock a date-time; and a unique information writing subunit operable, when judged that the registered number is less than the maximum number, to acquire a date-time clocked by the timer subunit as a registration date-time, and to register the unique information associatively with the registration date-time in a registration list. The selecting unit may make the selection based on registration dates-times.

With the structures stated above, clients to be a member device of each of a plurality of groups are selected alternately in the order of priority ranks or registration dates-times. Consequently, clients in each group are balanced in terms of the priority ranks or the registration dates-times.

Here, the judging unit of the server may judge whether a number of pieces of unique information registered in a registration list is less than the maximum number. The registering unit of the server may register the received unique information in the registration list when judged that the number of registered pieces is less.

With the structure stated above, a client is regarded to have joined a group when a server of the group registers the client by recording the unique information in the registered device list.

Here, the server may further include an input unit operable to receive unique information inputted from an external source. The judging unit may register the received unique information in a provisional registration list, and judge, on the receiving unit receiving the unique information, whether the provisional registration list includes unique information that is identical to the unique information received by the receiving unit. The registering unit of the server may register the unique information received by the receiving unit when judged that the registered number is less than the maximum number and that identical unique information is registered in the provisional registration list.

With the structure stated above, a device is registerable in a group only if its unique information is manually inputted to the server in advance. Consequently, it is prevented that a malicious third party from joining the group. Further, a portable device such as a notebook PC that may be carried to an outside location is provisionally registered in advance, and the portable device is counted as a registered device only after it is actually registered via a network.

Here, the communicating unit of the server may transmit the registration list to another server belonging to the group and receives another registration list from the other server, so that the registration lists are exchanged. The judging unit of the server may extract from the other registration list, unique information that is not registered in the registration list, and judge whether a number of pieces of unique information extracted is not greater than a remaining number that is a difference between the registered number and the maximum number. The registering unit of the server may additionally register the extracted unique information in the registration list when judged that the number of extracted pieces is not greater. When judged that the number of extracted pieces is greater, the registering unit of the server may select as many pieces of unique information as the maximum number from the unique information in the registration list and the extracted unique information, and renew the registration list by registering the thus selected unique information.

With the structure stated above, a plurality of servers shares a registered device list if they belong to the same group. Consequently, when a client registers with any of the servers, the client is automatically brought into registration with all the servers belonging to the group. Accordingly, even when one server is off, registration is carried out through another server.

Here, the registering unit of the server may include: a timer subunit operable to clock a date-time; and a unique information writing subunit operable, when judged that the registered number is less than the maximum number, to acquire a date-time clocked by the timer subunit as a registration date-time and to register the unique information associatively with the registration date-time in the registration list. When judged that the number of extracted pieces is greater, the unique information writing subunit may make the selection of unique information in an ascending order of registration dates-times.

Further, the receiving unit may acquire a priority rank of each client. When judged that the number of extracted pieces is greater, the registering unit may make the selection of unique information in a decreasing order of priority ranks.

With the structure stated above, when the number of clients requesting registration exceeds the maximum number registrable, the clients to be registered are selected based on the priority ranks or the registration dates-times.

Here, the communicating unit of the server may acquire from the other server, first identification information identifying a group to which the other server belongs. The judging unit of the server may prestore second identification information identifying a group to which the server belongs, and judge whether the acquired first identification information matches the second identification information. The communicating unit of the server may exchange the registration lists when the two pieces of identification information match.

With the structure stated above, the server exchanges the registration lists with the other server only after confirming that the other server belongs to the same group.

Here, the server may further include a determining unit operable; when a new group is to be formed by merging the group with another group and when the server is determined to belong to the new group, to determine, in conjunction with another server belonging to the other group, new-group identification information identifying the new group. The communicating unit of the server may transmit the registration list to the other server, and receive from the other server another registration list stored in the other server. The judging unit of the server may extract from the other registration list, unique information that is not registered in the registration list, judge whether a number of pieces of unique information extracted is not greater than a remaining number that is a difference between the registered number and the maximum number, increment the registered number by the number of extracted pieces when the number of extracted pieces is not greater, and alter the registered number to be equal to the maximum number when the number of extracted pieces is greater. The registering unit of the server may additionally register the extracted unique information in the registration list when the number of extracted pieces is not greater, and when judged that the number of extracted pieces is greater, select as many pieces of unique information as the maximum number from the unique information in the registration list and the extracted unique information and renew the registration list by registering the thus selected unique information. The communicating unit of the server may transmit the new-group identification to each client corresponding to the unique information registered in the registration list.

Further, the registering unit of the server may include: a timer subunit operable to clock a date-time; and a unique information writing subunit operable, when judged that the registered number is less than the maximum number, to acquire a date-time clocked by the timer subunit as a registration date-time, and to register in the registration list, the unique information associatively with the registration date-time. When judged that the number of extracted pieces is greater, the unique information writing subunit may make the selection of unique information in an ascending order of registration dates-times.

Further, the receiving unit may further receive a priority rank of each client. When judged that the number of extracted pieces is greater, the registering unit may make the selection of unique information in a decreasing order of priority ranks.

With the structures stated above, a plurality of groups may be merged into one new group. Further, when the total number of clients registered in each group exceeds the maximum number of devices registrable in the new group, clients to be registered in the new group are selected based on the priority ranks or the registration dates-times.

Here, the judging unit of the client may select a server from among a plurality of servers belonging to the group based on at least one of predetermined conditions that are a distance to the client, a time period taken to communicate with the client, a performance capability, and a processing state of each server. The communicating unit of the client may transmit the registration request and the unique information to the selected server.

With the structure stated above, the client selects, from among the plurality of servers, a server that is most suitable based on the predetermined conditions.

Here, the communicating unit of the client may receive from one of the servers belonging to the group and another server belonging to another group, identification information identifying a group to which a corresponding server belongs. The registering unit of the client may delete the registered identification information and newly register the further received identification information, so that the client joins the group identified by the further received identification information.

With the structure stated above, when a plurality of groups are merged into one new group or when one group is divided into a plurality of new groups, each client receives identification information from a server of a group to which the client newly belongs. Consequently, each client is appropriately made to belong to a new group that is formed after the merger or division.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A client device for joining a group by registering with a server that belongs to the group, the group being a range within which contents are available, the client device including a processor comprising:
  a judging unit that judges whether a total number of groups that the client device is currently registered to be in is less than a maximum number of groups that the client device is permitted to be in, when the client device attempts to join the group to be connected to the server, wherein the judging unit selects a server from among a plurality of servers belonging to the group based on at least one of a set of predetermined conditions including a distance to the client device, a time period taken to communicate with the client device, a performance capability and a processing state of each server;
  a communicating unit that (i) transmits to the server information unique to the client device, and receives from the server identification information identifying the group to which the server belongs when the total number of groups is less than the maximum number of groups that the client device is permitted to be in, and (ii) prevents transmission of the unique information to the server when the total number of groups is equal to or greater than the maximum number of groups; and a registering unit that registers the received identification information in the client device, wherein the registering unit monitors expiration of a valid period and deletes the identification information upon the expiration of the valid period.

2. The client device according to claim 1, further comprising an input receiving unit that receives an authentication value from an external source, wherein the communicating unit transmits a registration request that includes the authentication value.

3. The client device according to claim 2, wherein the input receiving unit receives a password as the authentication value.

4. The client device according to claim 2, wherein the input receiving unit receives a user's fingerprint as the authentication value, and extracts a feature from the fingerprint, and the communicating unit transmits the registration request that includes the feature.

5. The client device according to claim 2, wherein the input receiving unit receives a user's iris image as the authentication value, and extracts the feature from the iris image, and the communicating unit transmits the registration request that includes the feature.

6. The client device according to claim 1, wherein:
the communicating unit transmits the unique information to the selected server.

7. The client device according to claim 1, wherein:
the communicating unit acquires from a management device that is external to the group, a number of groups that the client device is permitted to be in, and makes a payment according to the acquired number; and
the judging unit sets the acquired number as the maximum number.

8. The client device according to claim 1, wherein:
the communicating unit acquires from a management device that is external to the group, a number of groups that the client device is additionally permitted to be in, and makes a payment according to the acquired number; and
the judging unit adds the acquired number to the maximum number to obtain a new maximum number.

9. The client device according to claim 1, wherein:
the communicating unit receives valid period information showing a valid period during which the client remains registered with the server after transmitting a registration request; and
the judging unit increments the registered number on registration of the identification information, and decrements the registered number on deletion of the identification information.

10. The client device according to claim 1, wherein:
the communicating unit further receives a notification informing that the valid period has expired after receiving the identification information,
the registering unit deletes the identification information on receipt of the notification; and
the judging unit increments the registered number on registration of the identification information and decrements the registered number on deletion of the identification information.

11. The client device according to claim 1 wherein:
the communicating unit transmits to the server a request for withdrawal of the client from the group and receives from the server a notification informing that the requested withdrawal is completed;
the registering unit deletes the identification information on receipt of the notification; and
the judging unit increments the registered number on registration of the identification information and decrements the registered number on deletion of the identification information.

12. The client device according to claim 11, wherein:
the registering unit registers the deleted identification information in a withdrawal list;
the communicating unit acquires the identification information from the server before transmitting a registration request;
the judging unit judges whether the withdrawal list includes identification information that is identical to the acquired identification information anywhere in the withdrawal list or at a last position of the withdrawal list in a registration order; and
the communicating unit transmits the registration request to the server when the judging unit judges that no identical information is registered in the withdrawal list or when identical information is registered at the last position of the withdrawal list.

13. The client device according to claim 1, wherein:
the communicating unit receives from one of the servers belonging to the group and another server belonging to another group, identification information identifying a group to which a corresponding server belongs; and
the registering unit deletes the registered identification information and newly registers the further received identification information, so that the client device joins the group identified by the further received identified information.

14. The client device according to claim 1, further comprising a selecting unit that selects whether each client device in the group is to remain in the group or to be withdrawn from the group and join the other group, when the client device is designated a server of another group and in conjunction with the server of the group, wherein
the communicating unit transmits identification information identifying the other group to the client device selected to join the other group, and
the registering unit deletes the identification registered, and registers unique information of the client device selected to join the other group.

15. The client device according to claim 14, wherein the communicating unit acquires from the server, unique information of the client device selected by the selecting unit to join the other group.

16. A group admission system in which a client device joins a group by registering with a server that belongs to the group, the group being a range within which contents are available, the group admission system including a processor comprising:
a first restricting unit in the client device that determines whether it is permissible for the client device to request to join the group based on a total number of groups that the client device is currently registered to be in and a maximum number of groups that the client is permitted to be in, by judging whether the total number of groups that the client device is currently registered to be in is less than the maximum number of groups the client device is permitted to be in, when the client device attempts to join the group to be connected to the server, wherein the first restricting unit selects a server from among a plurality of servers belonging to the group based on at least one of a set of predetermined conditions including a distance to the client device, a time period taken to communicate with the client device, a performance capability and a processing state of each server; and a communicating unit in the client device, the communicating unit (i) transmits to the server information unique to the client device, and receives from the server identification information identifying the group to which the server belongs when the first restricting unit judges that the total number of groups is less than the maximum number of groups the client device is permitted to be in, and (ii) prevents transmission of the unique information to the server when the total number of groups is equal to or greater than the maximum number of groups.

17. The group admission system according to claim 16, wherein when determined permissible by the first restricting unit, the client device requests to join the group by transmitting to the server the information unique to the client device, the server receives the unique information from the client, registers the received unique information, and transmits group identification information to the client device, and the client device receives and stores the group identification information.

18. A client device for joining a group by registering with a server that belongs to the group, the group being a range within which contents are available, the client device including a processor comprising:

a judging unit that judges whether a total number of groups that the client device is currently registered to be in is less than a maximum number of groups that the client device is permitted to be in, when the client device attempts to join the group to be connected to the server and the group is other than any group that the client device is currently registered to be in, wherein the judging unit selects a server from among a plurality of servers belonging to the group based on at least one of a set of predetermined conditions including a distance to the client device, a time period taken to communicate with the client device, a performance capability and a processing state of each server;

a communicating unit that (i) transmits to the server information unique to the client device, and receives from the server identification information identifying the group to which the server belongs when the total number of groups is less than the maximum number of groups that the client device is permitted to be in, and (ii) prevents transmission of the unique information to the server when the total number of groups is equal to or greater than the maximum number of groups; and a registering unit that registers the received identification information in the client device, wherein the registering unit monitors expiration of a valid period and deletes the identification information upon the expiration of the valid period.

19. A client device that joins a group associated with a server and receiving content from the server, by registering in the server unique information identifying the client device, the client device including a processor comprising:

a storage unit that stores a number of groups that currently register the client device and a maximum number of groups that are permitted to register the client device;

a judging unit that judges whether the number of groups that currently register the client device is less than the maximum number of groups that are permitted to register the client device, when the client device attempts to register the unique information identifying the client device in a predetermined server other than servers that currently register the unique information identifying the client device, wherein the judging unit selects a server from among a plurality of servers belonging to the group based on at least one of a set of predetermined conditions including a distance to the client device, a time period taken to communicate with the client device, a performance capability and a processing state of each server; and a communicating unit that transmits to the predetermined server the unique information identifying the client device for the registration of the unique information in the predetermined server, when it is judged that the number of groups that currently register the client device is less than the maximum number of the groups that are permitted to register the client device.

20. The client device according to claim 1, further comprising a storage unit that stores the total number of the groups that the client device is currently registered to be in and the maximum number of groups that the client device is permitted to be in.

21. The client device according to claim 18, further comprising a storage unit that stores the total number of the groups that the client device is currently registered to be in and the maximum number of groups that the client device is permitted to be in.

22. A group management system comprising:
a client device as defined in claim 20; and
a server device that supplies a content to member devices of a group belonging to the server and determines, when the client device requests to join the group, whether to permit the client device to join the group by registering with the server device, the determination being made based on a number of member devices registered with the server device and a maximum number of member devices registerable with the server device.

23. The group management system according to claim 22, wherein
the server device includes a storage unit that stores the number of member devices registered with the server device and the maximum number of member devices registerable with the server device.

24. A method for a client device of joining a group by registering with a server including a processor that belongs to the group, the group being a range within which contents are available, the method comprising:

judging, in a judging unit, whether a total number of groups that the client device is currently registered to be in is less than a maximum number of groups that the client device is permitted to be in, when the client device attempts to join the group to be connected to the server, wherein a server is selected, by the judging unit, from among a plurality of servers belonging to the group based on at least one of a set of predetermined conditions including a distance to the client device, a time period taken to communicate with the client device, a performance capability and a processing state of each server;

transmitting to the server information unique to the client device, and receiving from the server identification information identifying the group to which the server belongs when the total number of groups is less than the maximum number of groups that the client device is permitted to be in;

preventing transmission of the unique information to the server when the total number of groups is equal to or greater than the maximum number of groups; and registering the received identification information in the client device, wherein an expiration of a valid period is monitored and the identification information is deleted upon the expiration of the valid period.

25. A method for a group admission system in which a client device joins a group by registering with a server including a processor that belongs to the group, the group being a range within which contents are available, the method comprising:
    determining, in a first restricting unit of the client device, whether it is permissible for the client device to request to join the group based on a total number of groups that the client device is currently registered to be in and a maximum number of groups that the client is permitted to be in, by judging whether the total number of groups that the client device is currently registered to be in is less than the maximum number of groups the client device is permitted to be in, when the client device attempts to join the group to be connected to the server, wherein a server is selected, by the first restricting unit, from among a plurality of servers belonging to the group based on at least one of a set of predetermined conditions including a distance to the client device, a time period taken to communicate with the client device, a performance capability and a processing state of each server;
    transmitting to the server information unique to the client device, and receiving from the server identification information identifying the group to which the server belongs when it is judged that the total number of groups is less than the maximum number of groups the client device is permitted to be in; and
    preventing transmission of the unique information to the server when the total number of groups is equal to or greater than the maximum number of groups.

26. A method for a client device of joining a group by registering with a server including a processor that belongs to the group, the group being a range within which contents are available, the method comprising:
    judging, in a judging unit, whether a total number of groups that the client device is currently registered to be in is less than a maximum number of groups that the client device is permitted to be in, when the client device attempts to join the group to be connected to the server and the group is other than any group that the client device is currently registered to be in, wherein a server is selected, by the judging unit, from among a plurality of servers belonging to the group based on at least one of a set of predetermined conditions including a distance to the client device, a time period taken to communicate with the client device, a performance capability and a processing state of each server;
    transmitting to the server information unique to the client device, and receiving from the server identification information identifying the group to which the server belongs when the total number of groups is less than the maximum number of groups that the client device is permitted to be in;
    preventing transmission of the unique information to the server when the total number of groups is equal to or greater than the maximum number of groups; and
    registering the received identification information in the client device, wherein the expiration of a valid period is monitored and the identification information is deleted upon the expiration of the valid period.

27. A method for a client device that joins a group associated with a server and receiving content from the server including a processor by registering in the server unique information identifying the client device, the method comprising:
    storing, in a storage unit, a number of groups that currently register the client device and a maximum number of groups that are permitted to register the client device;
    judging, in a judging unit, whether the number of groups that currently register the client device is less than the maximum number of groups that are permitted to register the client device, when the client device attempts to register the unique information identifying the client device in a predetermined server other than servers that currently register the unique information identifying the client device, wherein a server the is selected, by the judging unit, from among a plurality of servers belonging to the group based on at least one of a set of predetermined conditions including a distance to the client device, a time period taken to communicate with the client device, a performance capability and a processing state of each server; and
    transmitting to the predetermined server the unique information identifying the client device for the registration of the unique information in the predetermined server, when it is judged that the number of groups that currently register the client device is less than the maximum number of the groups that are permitted to register the client device.

28. A method for a group admission system in which a client device joins a group by registering with a server that belongs to the group, the group being a range within which contents are available, the method comprising:
    in a client device including a processor,
    storing, in a storage unit, a number of groups that currently register the client device and a maximum number of groups that are permitted to register the client device;
    judging, in a judging unit, whether a total number of groups that the client device is currently registered to be in is less than a maximum number of groups that the client device is permitted to be in, when the client device attempts to join the group to be connected to the server, wherein a server is selected, by the judging unit, from among a plurality of servers belonging to the group based on at least one of a set of predetermined conditions including a distance to the client device, a time period taken to communicate with the client device, a performance capability and a processing state of each server;
    transmitting to the server information unique to the client device, and receiving from the server identification information identifying the group to which the server belongs when the total number of groups is less than the maximum number of groups that the client device is permitted to be in;
    preventing transmission of the unique information to the server when the total number of groups is equal to or greater than the maximum number of groups; and
    registering the received identification information in the client device, wherein an expiration of a valid period is monitored and the identification information is deleted upon the expiration of the valid period, and
    in a server device,
    supplying a content to member devices of a group belonging to the server; and
    determining, when the client device requests to join the group, whether to permit the client device to join the group by registering with the server device, the determination being made based on a number of member devices registered with the server device and a maximum number of member devices registerable with the server device.

* * * * *